United States Patent
Nomura

(10) Patent No.: US 10,268,257 B2
(45) Date of Patent: Apr. 23, 2019

(54) MEMORY CONTROL DEVICE THAT CONTROL SEMICONDUCTOR MEMORY, MEMORY CONTROL METHOD, INFORMATION DEVICE EQUIPPED WITH MEMORY CONTROL DEVICE, AND STORAGE MEDIUM STORING MEMORY CONTROL PROGRAM

(71) Applicant: CANON KABUSHIKI KAISHA, Tokyo (JP)

(72) Inventor: Yoshihisa Nomura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 14/494,943

(22) Filed: Sep. 24, 2014

(65) Prior Publication Data

US 2015/0089267 A1    Mar. 26, 2015

(30) Foreign Application Priority Data

Sep. 25, 2013 (JP) .................................. 2013-198330

(51) Int. Cl.
 G06F 1/32    (2006.01)
 G06F 11/30   (2006.01)
 G06F 13/16   (2006.01)
 G06F 1/3287  (2019.01)

(52) U.S. Cl.
 CPC ........ *G06F 1/3287* (2013.01); *G06F 11/3051* (2013.01); *G06F 13/1694* (2013.01); *G06F 2201/875* (2013.01); *Y02D 10/14* (2018.01)

(58) Field of Classification Search
 CPC .................................................... G06F 1/3287
 See application file for complete search history.

(56) References Cited

U.S. PATENT DOCUMENTS

| | | | |
|---|---|---|---|
| 5,918,242 A | 6/1999 | Sarma et al. | |
| 6,012,122 A * | 1/2000 | Choi | G11C 7/20 365/201 |
| 7,296,171 B2 * | 11/2007 | Hahn | G06F 9/4418 713/300 |

(Continued)

FOREIGN PATENT DOCUMENTS

| | | |
|---|---|---|
| JP | 2012109939 A | 6/2012 |
| JP | 2013004043 A | 1/2013 |
| KR | 101499304 B1 | 3/2015 |

OTHER PUBLICATIONS

Extended European Search Report issued in EP14186091.6, dated Mar. 5, 2015.

(Continued)

*Primary Examiner* — Jaweed A Abbaszadeh
*Assistant Examiner* — Cheri Harrington
(74) *Attorney, Agent, or Firm* — Rossi, Kimms & McDowell LLP

(57) ABSTRACT

A memory control device that is capable of making a nonvolatile memory of an information device exhibit the performance thereof certainly. A detection unit detects whether a data writable semiconductor memory is a nonvolatile memory or a volatile memory. A setting unit performs a setting to a volatile memory and performs a different setting to a nonvolatile memory that is detected with the detection unit.

9 Claims, 15 Drawing Sheets

(56) References Cited

U.S. PATENT DOCUMENTS

| | | | |
|---|---|---|---|
| 7,594,073 B2* | 9/2009 | Hanebutte | G06F 12/0866 711/113 |
| 8,051,253 B2 | 11/2011 | Okin et al. | |
| 8,805,457 B2* | 8/2014 | Sarker | G06F 1/3225 455/127.3 |
| 2002/0019919 A1* | 2/2002 | Chang | G06F 1/26 711/170 |
| 2002/0144074 A1 | 10/2002 | Wu et al. | |
| 2003/0052984 A1* | 3/2003 | Schinner | H04N 5/232 348/333.01 |
| 2003/0200379 A1* | 10/2003 | Hollingsworth | G06F 3/0607 711/103 |
| 2003/0217246 A1* | 11/2003 | Kubota | G06F 1/3203 711/170 |
| 2006/0101292 A1 | 5/2006 | Hahn et al. | |
| 2006/0245230 A1* | 11/2006 | Ambroggi | G11C 16/10 365/63 |
| 2007/0086268 A1* | 4/2007 | Shaetfer | G06F 13/1689 365/233.1 |
| 2008/0082766 A1 | 4/2008 | Okin et al. | |
| 2008/0117224 A1* | 5/2008 | Kimura | H04N 21/42692 345/531 |
| 2008/0320203 A1* | 12/2008 | Fitzgerald | G06F 1/3225 711/5 |
| 2009/0249015 A1* | 10/2009 | Tzeng | G06F 12/0866 711/165 |
| 2009/0287876 A1 | 11/2009 | Yeh | |
| 2010/0202238 A1* | 8/2010 | Moshayedi | G06F 11/1658 365/228 |
| 2010/0205348 A1* | 8/2010 | Moshayedi | G11C 5/14 711/102 |
| 2011/0239043 A1* | 9/2011 | Vedder | G06F 1/263 714/14 |
| 2012/0110286 A1 | 5/2012 | Yaoyama | |
| 2012/0166715 A1* | 6/2012 | Frost | G06F 11/1068 711/103 |
| 2012/0324251 A1* | 12/2012 | Bolanowski | G06F 1/3203 713/300 |
| 2012/0324252 A1 | 12/2012 | Barker | |
| 2013/0046934 A1* | 2/2013 | Nychka | G06F 12/0897 711/119 |
| 2013/0166932 A1* | 6/2013 | Iarovici | G06F 1/3206 713/323 |
| 2014/0056052 A1* | 2/2014 | Lee | G11C 13/0033 365/145 |
| 2014/0075227 A1* | 3/2014 | Shirota | G06F 1/324 713/323 |
| 2014/0181558 A1* | 6/2014 | Taha | G06F 1/3206 713/323 |
| 2014/0189198 A1* | 7/2014 | Siddiqi | G06F 12/0246 711/103 |
| 2014/0208006 A1* | 7/2014 | Yun | G06F 13/382 711/103 |
| 2014/0226400 A1* | 8/2014 | Kimura | G06F 1/3225 365/185.08 |
| 2014/0245045 A1* | 8/2014 | Haruki | G06F 1/329 713/323 |
| 2014/0281148 A1* | 9/2014 | Ichida | G06F 12/0246 711/103 |
| 2015/0026399 A1* | 1/2015 | Coquelin | G06F 13/1668 711/106 |
| 2015/0205462 A1* | 7/2015 | Jitkoff | G06F 3/0483 715/777 |

OTHER PUBLICATIONS

Office Action issued in Chinese Appln. No. 201410491575.8 dated May 3, 2017. English translation provided.

Notice of Allowance issued in Korean Patent Application No. 10-2014-0125697 dated Apr. 25, 2017. Partial English translation provided.

\* cited by examiner

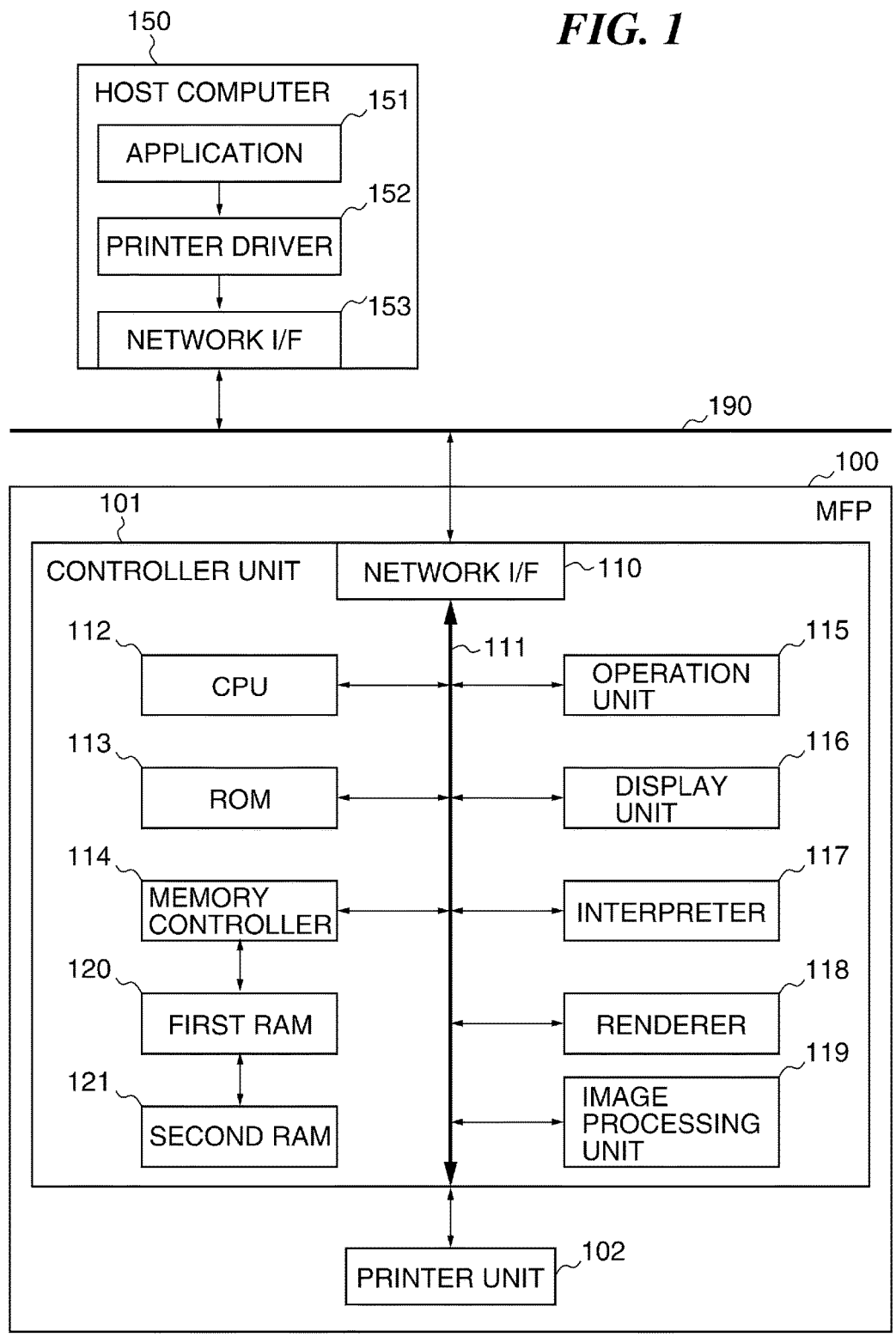

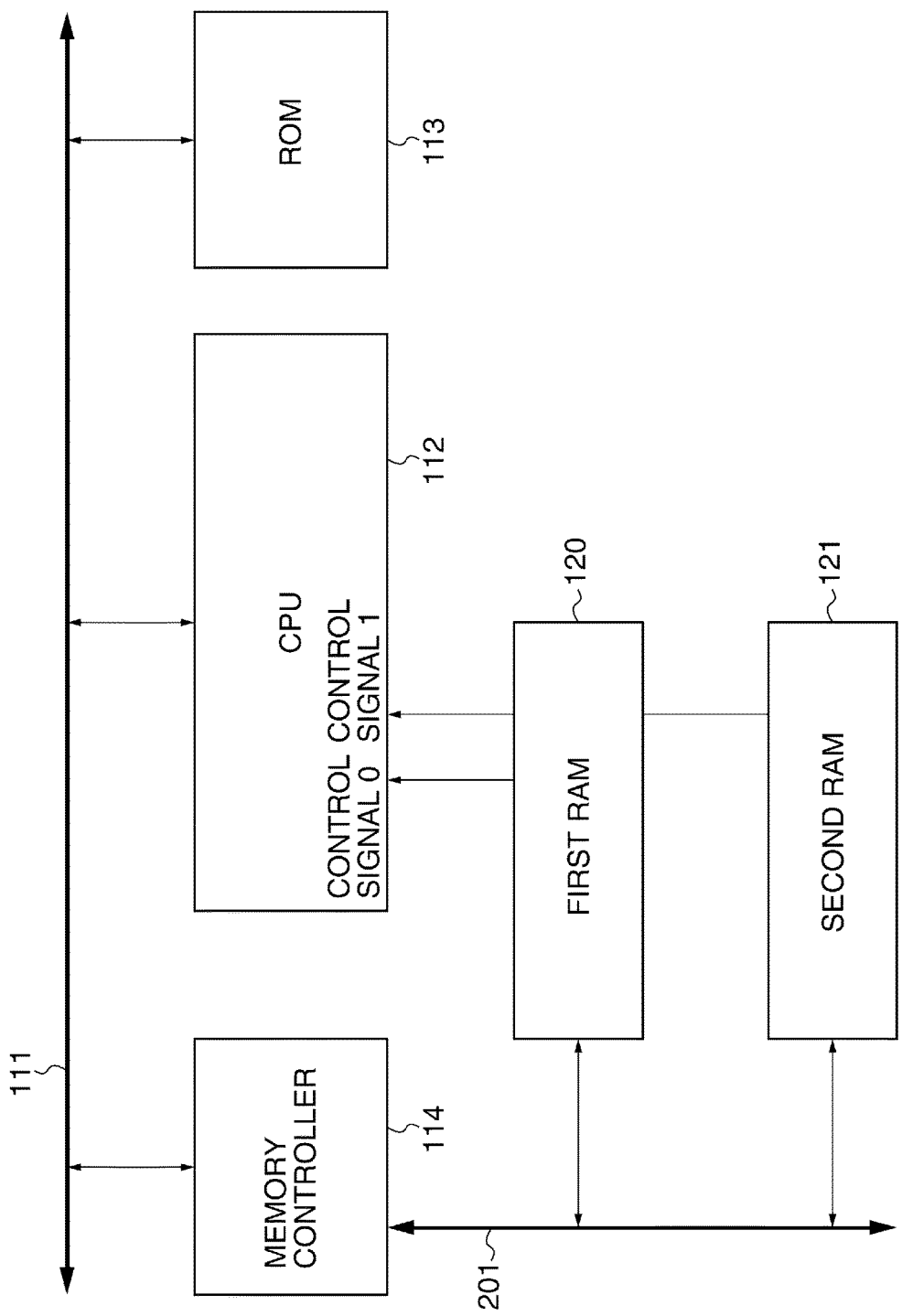

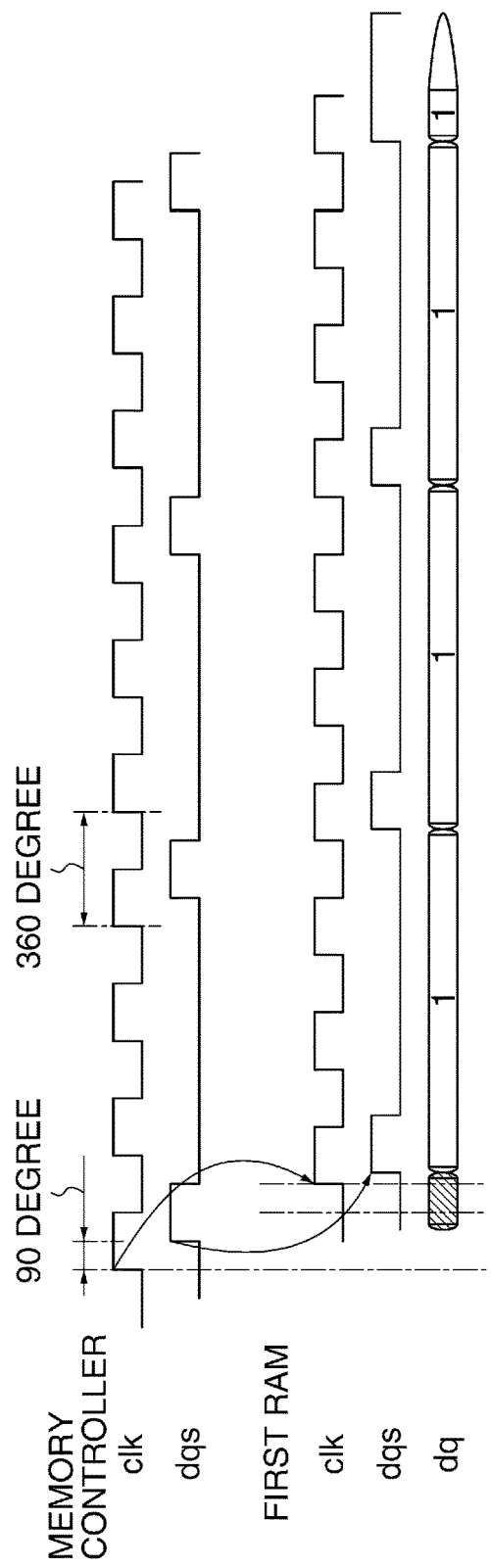

| ADDRESS | VALUE | CONTENTS | |
|---|---|---|---|
| 02h | 0x0B | MEMORY TYPE (GENERAL) | DDR3 SDRAM |
| 04h | 0x02 | SDRAM DEVICE DENSITY AND BANKS | 1Gb, 8banks |
| 12h | 0x0F | MINIMUM SDRAM CYCLE TIME (tCK_MIN) | 1.875ns |
| 14h | 0x1C | CAS LATENCIES SUPPORTED | CAS8, 7, 6 |
| 16h | 0x69 | MINIMUM CAS LATENCY TIME (tAA_MIN) | 13.125ns |
| 17h | 0x78 | MINIMUM WRITE RECOVERY TIME (tWR_MIN) | 15ns |
| 18h | 0x69 | MINIMUM RAS TO CAS DELAY (tRCD_MIN) | 13.125ns |
| 100h | 0x0 | VOLATILITY | VOLATILITY |

*FIG. 5A*

| ADDRESS | VALUE | CONTENTS | |
|---|---|---|---|
| 02h | 0x0B | MEMORY TYPE (GENERAL) | DDR3 MRAM |
| 04h | 0x02 | SDRAM DEVICE DENSITY AND BANKS | 1Gb, 8banks |
| 12h | 0x0F | MINIMUM SDRAM CYCLE TIME (tCK_MIN) | 1.875ns |
| 14h | 0x1C | CAS LATENCIES SUPPORTED | CAS8, 7, 6 |
| 16h | 0x69 | MINIMUM CAS LATENCY TIME (tAA_MIN) | 13.125ns |
| 17h | 0x78 | MINIMUM WRITE RECOVERY TIME (tWR_MIN) | 15ns |
| 18h | 0x69 | MINIMUM RAS TO CAS DELAY (tRCD_MIN) | 13.125ns |
| 100h | 0x1 | VOLATILITY | NON-VOLATILITY |

| PARAMETER | | | FIRST RAM | SECOND RAM |
|---|---|---|---|---|
| WRITE SKEW BETWEEN clk and dqs | DEGREE | bank0 | 90 | 98 |
| | | bank1 | 92 | 99 |
| | | bank2 | 93 | 100 |
| | | bank3 | 95 | 101 |
| | | bank4 | 96 | 102 |
| | | bank5 | 98 | 104 |
| | | bank6 | 100 | 106 |
| | | bank7 | 101 | 107 |
| READ SKEW BETWEEN clk and dqs | DEGREE | bank0 | 270 | 252 |
| | | bank1 | 271 | 254 |
| | | bank2 | 273 | 255 |
| | | bank3 | 275 | 257 |
| | | bank4 | 277 | 258 |
| | | bank5 | 279 | 260 |
| | | bank6 | 281 | 261 |
| | | bank7 | 283 | 263 |
| READ LATENCY | CYCLE | | 7 | 8 |

FIG. 7

| LIST | | VALUE | ADDRESS |
|---|---|---|---|
| F/W STORING LIST | chip select0 | NO | 0x8000_0000 |
| | chip select1 | YES | 0x0000_0000 |
| | chip select2 | NOT IMPLEMENTED | — |
| | chip select3 | NOT IMPLEMENTED | — |
| | chip select4 | NOT IMPLEMENTED | — |
| | chip select5 | NOT IMPLEMENTED | — |
| | chip select6 | NOT IMPLEMENTED | — |
| | chip select7 | NOT IMPLEMENTED | — |
| F/W STORABLE LIST | chip select0 | NO | — |
| | chip select1 | YES | — |
| | chip select2 | NOT IMPLEMENTED | — |
| | chip select3 | NOT IMPLEMENTED | — |
| | chip select4 | NOT IMPLEMENTED | — |
| | chip select5 | NOT IMPLEMENTED | — |
| | chip select6 | NOT IMPLEMENTED | — |
| | chip select7 | NOT IMPLEMENTED | — |
| WORK MEMORY LIST | chip select0 | YES | — |
| | chip select1 | NO | — |
| | chip select2 | NOT IMPLEMENTED | — |
| | chip select3 | NOT IMPLEMENTED | — |
| | chip select4 | NOT IMPLEMENTED | — |
| | chip select5 | NOT IMPLEMENTED | — |
| | chip select6 | NOT IMPLEMENTED | — |
| | chip select7 | NOT IMPLEMENTED | — |

FIG. 11

| LIST | | VALUE |
|---|---|---|
| POWER-OFF-MEMORY LIST | chip select0 | NO |
| | chip select1 | YES |
| | chip select2 | NOT IMPLEMENTED |
| | chip select3 | NOT IMPLEMENTED |
| | chip select4 | NOT IMPLEMENTED |
| | chip select5 | NOT IMPLEMENTED |
| | chip select6 | NOT IMPLEMENTED |
| | chip select7 | NOT IMPLEMENTED |
| SELF-REFRESH MEMORY LIST | chip select0 | NO |
| | chip select1 | NO |
| | chip select2 | NOT IMPLEMENTED |
| | chip select3 | NOT IMPLEMENTED |
| | chip select4 | NOT IMPLEMENTED |
| | chip select5 | NOT IMPLEMENTED |
| | chip select6 | NOT IMPLEMENTED |
| | chip select7 | NOT IMPLEMENTED |
| POWER NO-CONTROL MEMORY LIST | chip select0 | NO |
| | chip select1 | NO |
| | chip select2 | YES |
| | chip select3 | YES |
| | chip select4 | YES |
| | chip select5 | YES |
| | chip select6 | YES |
| | chip select7 | YES |

MEMORY CONTROL DEVICE THAT CONTROL SEMICONDUCTOR MEMORY, MEMORY CONTROL METHOD, INFORMATION DEVICE EQUIPPED WITH MEMORY CONTROL DEVICE, AND STORAGE MEDIUM STORING MEMORY CONTROL PROGRAM

BACKGROUND OF THE INVENTION

Field of the Invention

The present invention relates to a memory control device that controls a semiconductor memory, a memory control method, an information device equipped with this memory control device, and a storage medium storing a program that make a computer execute the memory control method.

Description of the Related Art

Improvement in processing speed of a CPU and an LSI for peripheral circuitry requires improvement in data transfer rate of a semiconductor memory in recent years. One of various semiconductor memories is an SDRAM that is a synchronous semiconductor memory. An SDRAM is controlled so as to input and output data in synchronizing with a system clock of an LSI. Control signals, such as RAS, CAS, WE, are inputted into the SDRAM in synchronizing with a rising edge of a system clock CLK. The SDRAM receives a control instruction (command) that is determined by a combination of High level of Low level of these input signals. Moreover, an address and data are also inputted into the SDRAM in synchronizing with the rising edge of the CLK. By achieving such a synchronous semiconductor memory, the data input-and-output transfer rate to a memory improves substantially.

However, a problem that setup times and hold times of various input signals become short occurs to synchronization with the CLK as the data transfer rate of a semiconductor memory improves. In order to achieve a required setup time and hold time in a synchronous semiconductor memory, it is necessary that an initial circuit for inputting an address and data is always in an activated state irrespective of a control instruction. Accordingly, there is a known technique about a semiconductor memory that employs a data strobe signal (DQS) in order to achieve high-speed data transmission. As semiconductor memory that employs the data strobe signal, there are a DDR2 SDRAM, a DDR3 SDRAM, etc., for example.

Incidentally, various types of information devices including a multifunctional peripheral device (MFP) have a problem of increasing power consumption of an LSI and a semiconductor memory inside a device, and are required to reduce power consumption. There is a method of reducing power consumption by locally shifting LSI etc. to a power saving mode (sleep mode) or by shutting off the power supplied to the LSI etc. However, since the data stored in a volatile memory disappears by shutting off the power, it is necessary to save the data stored in a volatile memory to a nonvolatile memory before shutting off the power. Moreover, since the saved data is required to be returned at the next power-on timing, a new problem that start-up time becomes long because data transition takes time occurs.

There is a proposed technique that employs a nonvolatile memory, such as a magnetic reluctance memory (referred to as an "MRAM", hereafter), as substitution of a volatile memory, such as a DDR3 SDRAM (for example, see Japanese Laid-Open Patent Publication (Kokai) No. 2013-4043 (JP 2013-4043A)). Since an MRAM is able to hold data with magnetism even when the device power shuts off, and allows a high-speed access, it is unnecessary to save the above-mentioned data before shutting off the device power. Moreover, an information device using an MRAM stores a boot program into the MRAM at the first power-on, and executes the boot program read from the MRAM when the power turns on again after shutting off the power. This allows high-speed start-up.

Incidentally, an MRAM is compatible with a DDR3 SDRAM that is a volatile memory. Accordingly, in an information device provided with a plurality of memory slots so that a plurality of memory devices can be implemented, since a user is able to add and exchange memory devices, a DDR3 SDRAM and an MRAM may be intermingled within an information device. In this case, since there is a possibility that the boot program, which should be stored in an MRAM, is stored in a DDR3 SDRAM, the performance of the MRAM cannot be utilized effectively.

SUMMARY OF THE INVENTION

The present invention provides a memory control device that is capable of making a nonvolatile memory of an information device exhibit the performance thereof certainly.

Accordingly, a first aspect of the present invention provides a memory control device comprising a detection unit configured to detect whether a data writable semiconductor memory is a nonvolatile memory or a volatile memory, and a setting unit configured to perform a setting to a volatile memory and to perform a different setting to a nonvolatile memory that is detected with the detection unit.

Accordingly, a second aspect of the present invention provides a memory control method executed by a computer comprising a detection step of detecting whether a data writable semiconductor memory is a nonvolatile memory or a volatile memory, and a setting step of performing a setting to a volatile memory and of performing a different setting to a nonvolatile memory that is detected in the detection step.

Accordingly, a third aspect of the present invention provides an information device comprising semiconductor memories, and a memory control device configured to control operations of the semiconductor memories. The memory control device comprises a detection unit configured to detect whether each of the semiconductor memory is a nonvolatile memory or a volatile memory, and a setting unit configured to perform a setting to a volatile memory and to perform a different setting to a nonvolatile memory that is detected with the detection unit.

In the present invention, the memory information is detected at the start-up of the information device, and a nonvolatile memory is specified. Since this allows setting and changing the memory mapping and the power control according to the detection result, the performance of the nonvolatile memory is exhibited certainly.

Further features of the present invention will become apparent from the following description of exemplary embodiments with reference to the attached drawings.

BRIEF DESCRIPTION OF THE DRAWINGS

FIG. 1 is a block diagram schematically showing a configuration of a network system including an MFP according to an embodiment of the present invention and a configuration of hardware of the MFP.

FIG. 2 is a block diagram schematically showing relationship between a CPU and a memory controller in a controller unit of the MFP in FIG. 1.

FIG. 3A and FIG. 3B are timing charts showing signals of clk and dqs of the memory controller and a first RAM on a memory bus during write leveling in the MFP in FIG. 1.

FIG. 5A and FIG. 5B are views showing examples of memory information that are read from SPDs of the first RAM and the second RAM (memory module) with which the MFP in FIG. 1 is provided.

FIG. 6 is a view showing examples of results of initialization calibrations of the first RAM and the second RAM with which the MFP in FIG. 1 is provided.

FIG. 7 is a view showing an example of a work memory list of the MFP in FIG. 1.

FIG. 11 is a view showing an example of the power control memory list generated through the process of the flowchart shown in FIG. 10.

DESCRIPTION OF THE EMBODIMENTS

Figure 3A:
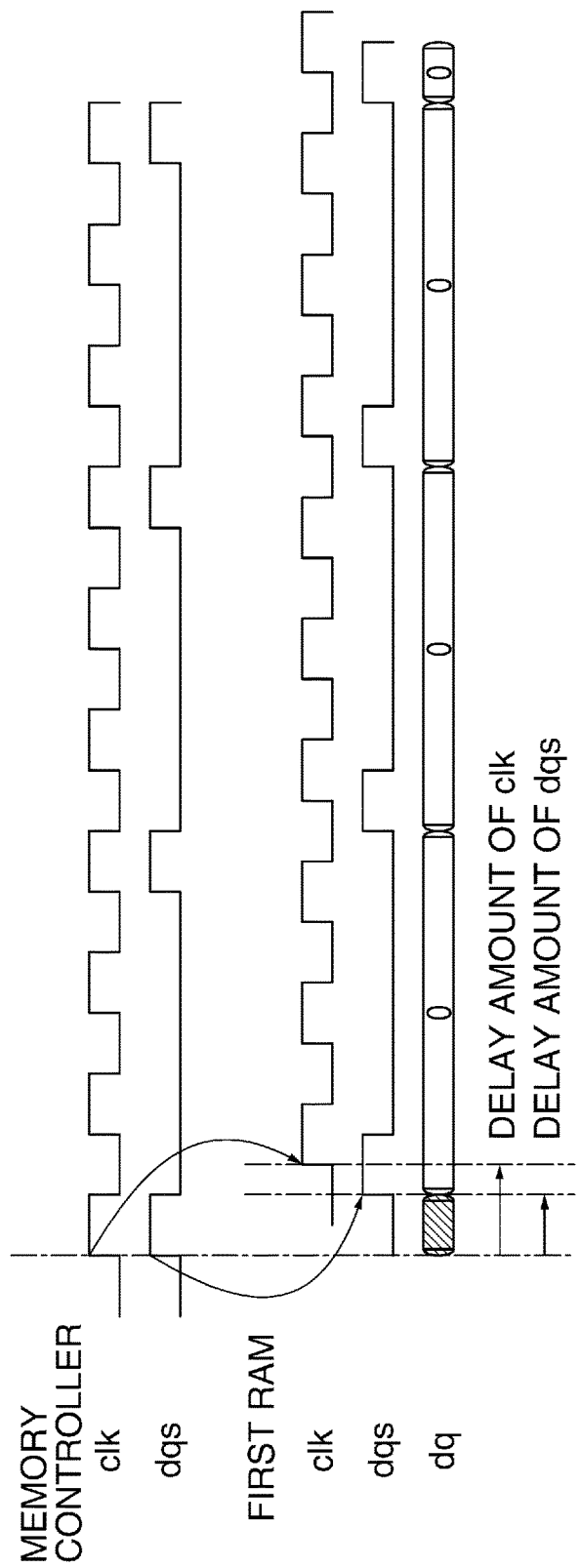

Hereafter, embodiments according to the present invention will be described in detail with reference to the drawings. Although an MFP (Multifunction Peripheral) is taken up as an information device equipped with a memory control device in the following description, the present invention is not limited to this.

FIG. 1 is a block diagram schematically showing a configuration of a network system including an MFP according to a first embodiment of the present invention and a configuration of hardware of the MFP. This network system is constituted by connecting a host computer 150 and the MFP 100 through an external network 190. For example, the host computer 150 sends a drawing command (print data) to the MFP 100, and the MFP 100 that received the drawing command converts the command into image data that can be output (printed), and prints it on a paper sheet.

The host computer 150 is provided with an application 151, a printer driver 152, and a network I/F 153. The application 151 is software that operates on the host computer 150. Execution of a predetermined application allows to generate a page layout document, a word processor document, a graphic document, etc. Digital document data generated with the application 151 is transmitted to the printer driver 152, which generates a drawing command according to the digital document data. The drawing command generated with the printer driver 152 is described in a printer description language like a PDL (Page Description Language) for generating page image data, for example. Data drawing instructions of characters, graphics, images, etc. are usually included in the drawing command. The drawing command generated with the printer driver 152 is transmitted to the MFP 100 through the network I/F 153 and the external network 190.

The MFP 100 is provided with a controller unit 101, a printer unit 102, a scanner unit (not shown), and a modem (not shown). The controller unit 101 includes a network I/F 110, a CPU 112, a ROM 113, a memory controller 114, an operation unit 115, a display unit 116, an interpreter 117, a renderer 118, an image processing unit 119, a first RAM 120, and a second RAM 121. These modules included in the controller unit 101 are connected through a system bus 111.

The network I/F 110 is an interface for connecting the MFP 100 to the external network 190. The network I/F 110 receives a drawing command from the host computer 150 or an external device (not shown) connected to the external networks 190 through the external network 190 based on a communication protocol, such as the Ethernet (registered trademark). Moreover, the device information (for example, jam information, paper size information, etc.) of the MFP 100 and the image data are transmitted to the host computer 150 or an external device (not shown) connected to the external network 190 through the network I/F 110.

Various programs, which include an initialization sequence, a power control sequence, etc. as mentioned later, for controlling operations of the MFP 100 are stored in the ROM 113. The CPU 112 expands the various programs and data stored in the ROM 113 to the work area of the first RAM 120 or the second RAM 121, and executes the programs to control operations of the various modules that constitute the MFP 100. This controls the entire operation of the MFP 100.

General usage of the first RAM 120 and the second RAM 121, which are semiconductor memories, is described first, and concrete usage in this embodiment will be described later. As mentioned above, the first RAM 120 and the second RAM 121 are used as the work areas of the CPU 112 as temporary storage devices, and also temporarily store various kinds of data generated when the CPU 112 executes various programs. Moreover, the first RAM 120 and the second RAM 121 temporarily store intermediate language data, raster image data, etc. (mentioned later) during a process using the printer unit 102. It should be noted that the MFP 100 may be provided with memory devices (RAM only) other than the first RAM 120 and the second RAM 121.

The memory controller 114 controls the data transmission and reception among the first RAM 120, the second RAM 121, and the other modules included in the controller unit 101. The operation unit 115 is an interface for receiving input from a user, and consists of various hard buttons and a touch panel. The display unit 116, which is a liquid crystal display etc., displays UI (User Interface) screens that show instructions to a user and the state of the MFP 100. The liquid crystal display may be a touch panel of the operation unit 115.

The interpreter 117 interprets the drawing command received through the network I/F 110, and generates intermediate language data. The renderer 118 generates a raster image from the intermediate language data generated by the interpreter 117. The image processing unit 119 applies image processings, such as a color conversion process, a gamma correction process using a look-up table, and a pseudo halftone process, to the raster image generated by the renderer 118, and generates the image data that will be supplied to the printer unit 102. The printer unit 102 forms an image on a paper sheet using toner etc. according to the image data generated by the image processing unit 119.

In the MFP 100, an MRAM that is a nonvolatile memory and a DRAM (or an SDRAM) that is a volatile memory may be intermingled in the first RAM 120 and the second RAM 121. Accordingly, the CPU 112 performs memory mapping that detects a nonvolatile memory and stores firmware (referred to as "F/W", hereafter) to the detected nonvolatile memory. Hereinafter, details thereof will be described.

FIG. 2 is a block diagram schematically showing relationship between the CPU 112 and the memory controller 114 in the controller unit 101 of the MFP 100. The CPU 112 executes an initialization sequence for each module connected to the system bus 111 including the first RAM 120 and the second RAM 121 by executing the boot program stored in the ROM 113. Moreover, the CPU 112 reads the F/W from the ROM 113 or the hard disk drive (HDD, not shown), and expands it as programs onto the first RAM 120 and the second RAM 121. The CPU 112 performs various numerical computations (information processing) and controls operations of the MFP 100 by executing the programs expanded. Further, the CPU 112 stores the information about the various modules that constitute the controller unit 101 into the first RAM 120, the second RAM 121, or the HDD (not shown), and holds it.

The memory controller 114, which controls the first RAM 120 and the second RAM 121, issues a command to the first RAM 120 and the second RAM 121 through the memory bus 201, and performs memory access. Moreover, the memory controller 114 executes calibration that adjusts timings of write access and read access for high-speed communication with the first RAM 120 and the second RAM 121. Well-known technique can be used for this calibration, and it will be described briefly hereafter.

In order to read and write data from and to a RAM at high speed, delay adjustment should be designed appropriately in general. For example, it is necessary to design a section that captures read data outputted from a RAM with an internal flip-flop and a section that synchronizes the data from the flip-flop with a system clock.

There is a known technique that calculates a delay amount until the clock outputted from a memory controller returns to the memory controller as a data strobe signal DQS via a RAM to determine the scope of the synchronized data. The delay amount is called round trip delay. For example, write leveling and read leveling for adjusting access timings of read and write were incorporated as functions of a DDR3 SDRAM in the specification of Solid State Technology Association (JEDEC). The write leveling outputs skew information between a clk signal and a dqs signal, when "1" is set to write leveling enable of a MR1 register of the RAM. Specifically, the clk signal is sampled to a rising edge of the dqs signal issued by the memory controller, and high level is returned to a dq signal. The memory controller adjusts the timings on the basis of the dq signal so that the interval between the timings becomes longest by shifting the phase between the clk signal and the dqs signal slightly.

FIG. 3A and FIG. 3B are timing charts showing the signals of clk and dqs of the memory controller 114 and the first RAM 120 on the memory bus 201 during the write leveling. It should be noted that the first RAM 120 shall be a DDR3 SDRAM in the descriptions about FIG. 3A and FIG. 3B.

Even if the clk signal and the dqs signal are simultaneously outputted from the memory controller 114, the rising timings of the clk signal and the dqs signal in the first RAM 120 are different with effects of a wire length, wiring load, etc. In FIG. 3A, since the clk signal and the dqs signal have reached at different timings, the first RAM 120 returns "0" to the dq signal. The memory controller 114 shifts the output timings of the clk signal and the dqs signal, and searches for the change point of the dq signal. In contrast, in FIG. 3B, since the dq signal is "1", the clk signal is sampled at the rising edge of the dqs signal.

On the other hand, when an MPR (Multi Purpose Register) becomes effective in the read leveling, a predetermined data pattern is outputted from the first RAM 120. The memory controller 114 is able to know a timing of receiving this data pattern, and adjusts the latency between an issuing timing of a read command and a receiving timing of read data. At the time of read access, the first RAM 120 outputs the dqs signal.

The memory controller 114 first detects the number of cycles until receiving the data after issuing the read command. The memory controller 114 adds the number of cycles that consider command-and-data transfer delay time one by one to the read-latency time of the first RAM 120 after issuing a read command, and detects a timing at which the value of MPR is read. When detecting the number of cycles, the memory controller 114 detects the best change point while shifting little by little the timing of reading the read data after detecting the internal dqs signal in order to adjust the skew between the clk signal and the dqs signal.

The memory controller 114 is able to write and read data to and from the first RAM 120 and the second RAM 121 according to a predetermined protocol. In this embodiment, the first RAM 120 and the second RAM 121 shall be memory modules each of which consists of a plurality of memory devices and an SPD (Serial Presence Detect). Moreover, the first RAM 120 is a volatile memory, and the volatile memory shall be a DDR3 SDRAM. The volatile memory is not limited to the DDR3 SDRAM, but may be an SDRAM, a DDR SDRAM, a DDR2 SDRAM, a DDR4 SDRAM, SRAM, etc. Furthermore, the second RAM 121 is a nonvolatile memory, and the nonvolatile memory shall be a DDR3 MRAM. The nonvolatile memory is not limited to the DDR3 MRAM, but may be another nonvolatile memory.

The description returns to FIG. 2. The memory bus 201 is a high-speed communication bus for connecting the memory controller 114, the first RAM 120, and the second RAM 121. When the power is supplied to the MFP 100, the CPU 112 reads the boot program stored in the ROM 113 through the system bus 111, and executes the initialization sequence for initializing the MFP 100. Hereinafter, the initialization sequence by the boot program for the first RAM 120 and the second RAM 121 is described with reference to the flowchart in FIG. 4.

Figure 4:
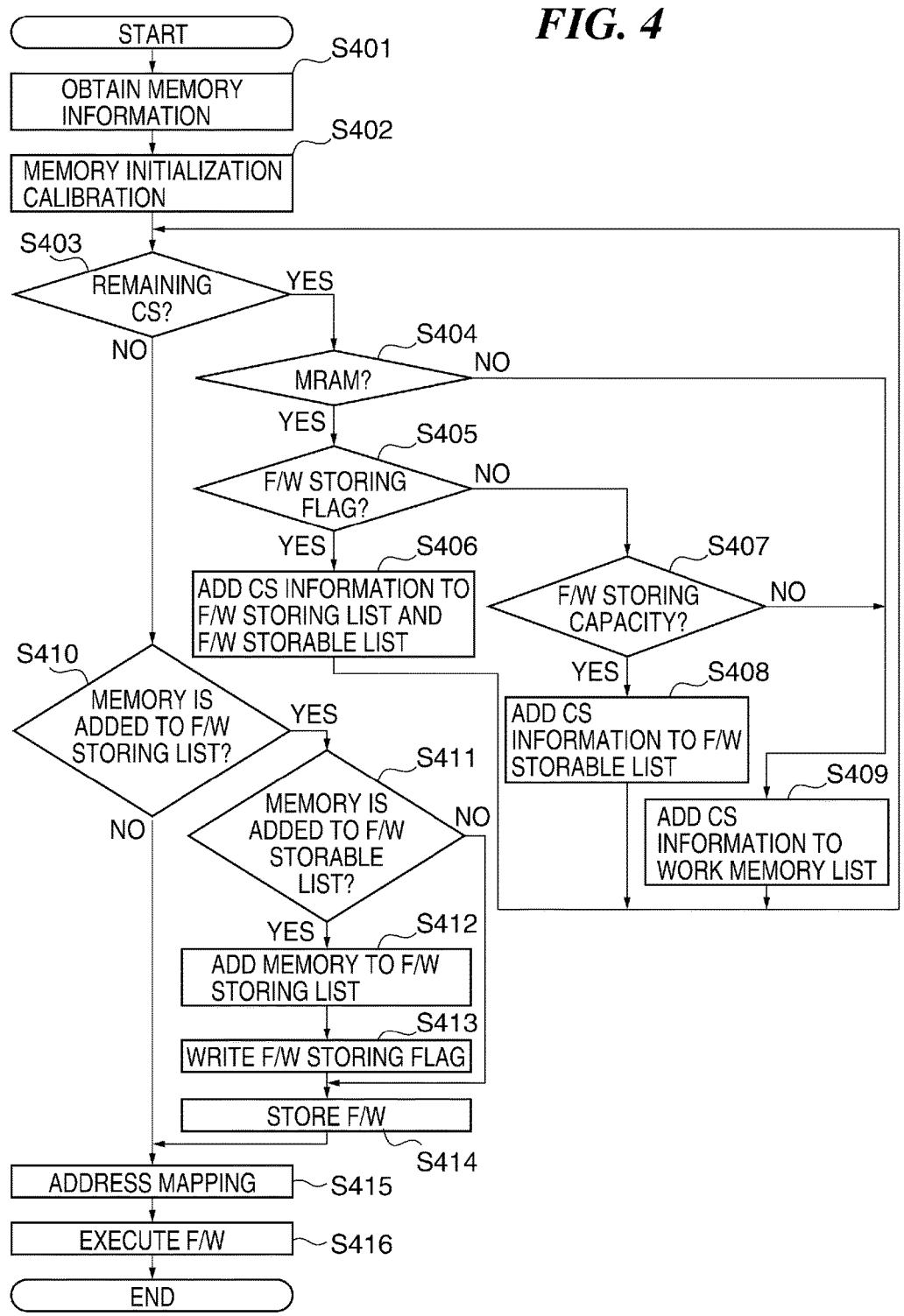
FIG. 4 is a flowchart showing an initialization sequence for memory devices (the first RAM and a second RAM) in the MFP in FIG. 1.

FIG. 4 is a flowchart showing an initialization sequence for the first RAM 120 and the second RAM 121 that are implemented in the MFP 100. Each process in the flowchart in FIG. 4 is achieved when the CPU 112 reads the boot program stored in the ROM 113, develops it to the first RAM 120 or the second RAM 121, and executes the developed program. It should be noted that descriptions about initialization sequences for modules other than the first RAM 120 and the second RAM 121 are omitted. Moreover, here is described as the initialization sequence for a memory device (RAM only) that is not limited to the first RAM 120 and the second RAM 121. Then, the processing results about the first RAM 120 and the second RAM 121 will be described.

In step S401, the CPU 112 obtains memory information about the memory device by the control signals "0" and "1" (see FIG. 2) through a serial bus first. For example, specification information is obtained from an SPD implemented in the memory module. This enables power control of each memory device. It should be noted that the specification information is the information about a volatile memory or a nonvolatile memory, the maximum clock frequency, capacity, a signal timing, etc., for example.

FIG. 5A and FIG. 5B are views showing examples of the memory information that is read from the SPD of the memory module. It should be noted that addresses and values shown in FIG. 5A and FIG. 5B are examples, and not all timing parameters are described. The CPU 112 stores necessary information into an HDD (not shown) out of the memory information read from the SPD, for example.

FIG. 5A shows the memory information obtained about the first RAM 120, and the read address and values show that the first RAM 120 is a DDR3 SDRAM, 1066 MHz, 1 Gbit, 8 banks, and volatility. FIG. 5B shows the memory information obtained about the second RAM 121, and the information shows that the second RAM 121 is a DDR3 MRAM, 1066 MHz, 1 Gbit, 8 banks, and non-volatility.

Next, the CPU 112 issues an execution command of calibration of memory initialization to the memory controller 114. Accordingly, the memory controller 114 executes the calibration to initialize the memory device in step S402. Specifically, the CPU 112 maps addresses to the memory devices, which are implemented at the time of memory initialization, one by one with the memory controller 114 on the basis of the information obtained in the step S401. Then, the CPU 112 adjusts the timings of both write leveling and read leveling with respect to each of the memory devices using the memory controller 114. The CPU 112 stores the skew information and the read latency between the clk signal and the dqs signal at the write access timing and the read access timing of each bank of each memory device.

FIG. 6 is a view showing examples of results of the initialization calibrations of the first RAM 120 and the second RAM 121. When the initialization calibrations of the first RAM 120 and the second RAM 121 by the memory controller 114 are completed, the CPU 112 becomes possible to access the first RAM 120 and the second RAM 121.

After termination of the step S402, the CPU 112 starts a memory mapping process to every chip select (referred to as "CS", hereafter), and determines whether there is a remaining CS to which the memory mapping process is not applied in step S403. When there is a remaining CS (YES in the step S403), the CPU 112 proceeds with the process to step S404. When there is no remaining CS (NO in the step S403), the CPU 112 proceeds with the process to step S410.

In step S404, the CPU 112 determines whether the memory device of the CS selected in the step S403 is a DDR3 MRAM (a nonvolatile memory) on the basis of the memory information obtained in the step S401. When the memory device concerned is a DDR3 MRAM (it is a nonvolatile memory (YES in the step S404)), the CPU 112 proceeds with the process to step S405. When the memory device concerned is not a DDR3 MRAM (it is a volatile memory (NO in the step S404)), the CPU 112 proceeds with the process to step S409.

In the step S405, the CPU 112 determines whether the selected CS has a F/W storing flag. For example, this judgment is made by determining whether a predetermined flag value is stored in a leading address 0x0 of the memory device. When there is the F/W storing flag (YES in the step S405), the CPU 112 proceeds with the process to step S406. When there is not the F/W storing flag (NO in the step S405), the CPU 112 proceeds with the process to step S407.

In the step S406, the CPU 112 adds and stores CS information to a F/W storing list and a F/W storable list. Then, the CPU 112 returns the process to the step S403.

In the step S407, the CPU 112 determines whether there is F/W storing capacity. Specifically, the CPU 112 compares the memory capacity information obtained in the step S401 and F/W capacity information that has been stored beforehand in the ROM 113. When there is the F/W storing capacity (YES in the step S407), the CPU 112 proceeds with the process to step S408. When there is no F/W storing capacity (NO in the step S407), the CPU 112 proceeds with the process to the step S409.

In step S408, the CPU 112 adds and stores the CS information to the F/W storable list. In the step S409, the CPU 112 adds and stores the CS information to a work memory list. The process returns to the step S403 after finishing the step S408 or S409.

FIG. 7 is a view showing an example of the work memory list of the MFP 100. After the process in the steps S403 through S409 is completed for all the CSs, the work memory list shown in FIG. 7 is obtained. In this embodiment, CS0 (chip select 0) and CS1 (chip select 1) shall correspond to the first RAM 120 and the second RAM 121, respectively, and the F/W storing flag shall be written in the second RAM 121. Since the first RAM 120 is a volatile memory, "No" is written in the CS0s in the F/W storing list and the F/W storable list, and "Yes" is written in the CS0 in the work memory list. On the other hand, since the second RAM 121 is a nonvolatile memory and has the F/W storing flag, "Yes" is written in the CS1s in the F/W storing list and the F/W storable list, and "No" is written in the CS1 in the work memory list.

In the step S410 after the determination in the step S403 was No, the CPU 112 determines whether there is a memory added to the F/W storing list from the work memory list in FIG. 7. When there is a memory added (YES in the step S410), the CPU 112 proceeds with the process to step S411. When there is no memory added (NO in the step S410), the CPU 112 proceeds with the process to step S415.

In the step S411, the CPU 112 determines whether there is a memory added to the F/W storable list from the work memory list in FIG. 7. When there is a memory added (YES in the step S411), the CPU 112 proceeds with the process to step S412. When there is no memory added (NO in the step S411), the CPU 112 proceeds with the process to step S414.

In the step S412, the CPU 112 selects one CS that is "Yes" in the F/W storable list, and adds the memory device of the CS to the F/W storing list. In the subsequent step S413, the CPU 112 stores the predetermined flag value in the leading address 0x0 of the memory device of the CS selected in the step S412. Accordingly, the memory device added to the F/W storing list in the step S412 will be determined to have the F/W storing flag in the step S405 at the next start-up of the MFP 100.

In the step S414, the CPU 112 stores the F/W into the memory device having the F/W storing flag. It should be noted that the F/W may be stored in the ROM 113, a storage media like an HDD (not shown), or a storage device of the external network 190. The process proceeds to the step S415 after the step S414.

In the step S415, the CPU 112 performs address mapping as shown in the work memory list in FIG. 7. Specifically, in the step S415, the address area designated when the boot program executes the F/W is allocated to the memory device (CS) that stores the F/W. In this embodiment, the F/W execution address shall be 0x0000_0000, and 0x0000_0000 is allocated to the DDR3 MRAM (the second RAM 121) of the CS1 as shown in FIG. 7. Moreover, the address areas used as work memories are allocated to memory devices other than the memory device to which the F/W execution address was allocated. Accordingly, as shown in FIG. 7, 0x8000_0000 is allocated to the DDR3 SDRAM (the first RAM 120) of the CS0.

In the subsequent step S416, the CPU 112 executes the F/W from the address designated in the step S415, and this process is finished after that.

In this embodiment, the memory mapping was performed so that the F/W is stored in the nonvolatile memory (the DDR3 MRAM (the second RAM 121)). In addition to that, facsimile image data, page count data, remaining toner amount, etc. that must be held in the MFP 100 may be also stored in the nonvolatile memory with the same method. Moreover, the intermediate image data used temporarily (for example, scan data read by a scanner unit (not shown) with which the MFP 100 is provided) may be stored in the volatile memory (the DDR3 SDRAM (the first RAM 120)).

Incidentally, the case where the capacity of the second RAM 121 that is a nonvolatile memory is insufficient to store the F/W is assumed. In this case, when there is another nonvolatile memory (for example, a flash memory) or an HDD, the F/W and the other programs and data that must be held are mapped to them. Moreover, it is also assumed that both of the first RAM 120 and the second RAM 121 are volatile memories (i.e., there is no nonvolatile memory). Also in this case, the same method for the above-mentioned case where the capacity of the nonvolatile memory is insufficient is employed.

As described above, according to the first embodiment, even if a nonvolatile memory and a volatile memory are intermingled and implemented in the MFP 100, it is able to know which memory device is a nonvolatile memory. Accordingly, since the F/W is mapped to a nonvolatile memory, the time period required for the transition to the power saving mode (sleep mode) and the return from the power saving mode of the MFP 100 is shortened, for example.

Next, a second embodiment of the present invention will be described. In the first embodiment, the CPU 112 obtains memory information about a memory device from an SPD implemented in a memory module in the step S401 of the initialization sequence, and determines whether the memory device is a nonvolatile memory or a volatile memory. On the other hand, in the second embodiment, when there is no memory information from an SPD, it is determined whether a memory device is a nonvolatile memory or a volatile memory by changing a refresh command interval. More specifically, the CPU 112 determines whether a memory device is a nonvolatile memory or a volatile memory by prohibiting issue of the refresh command beyond a predetermined time period.

Figure 8:
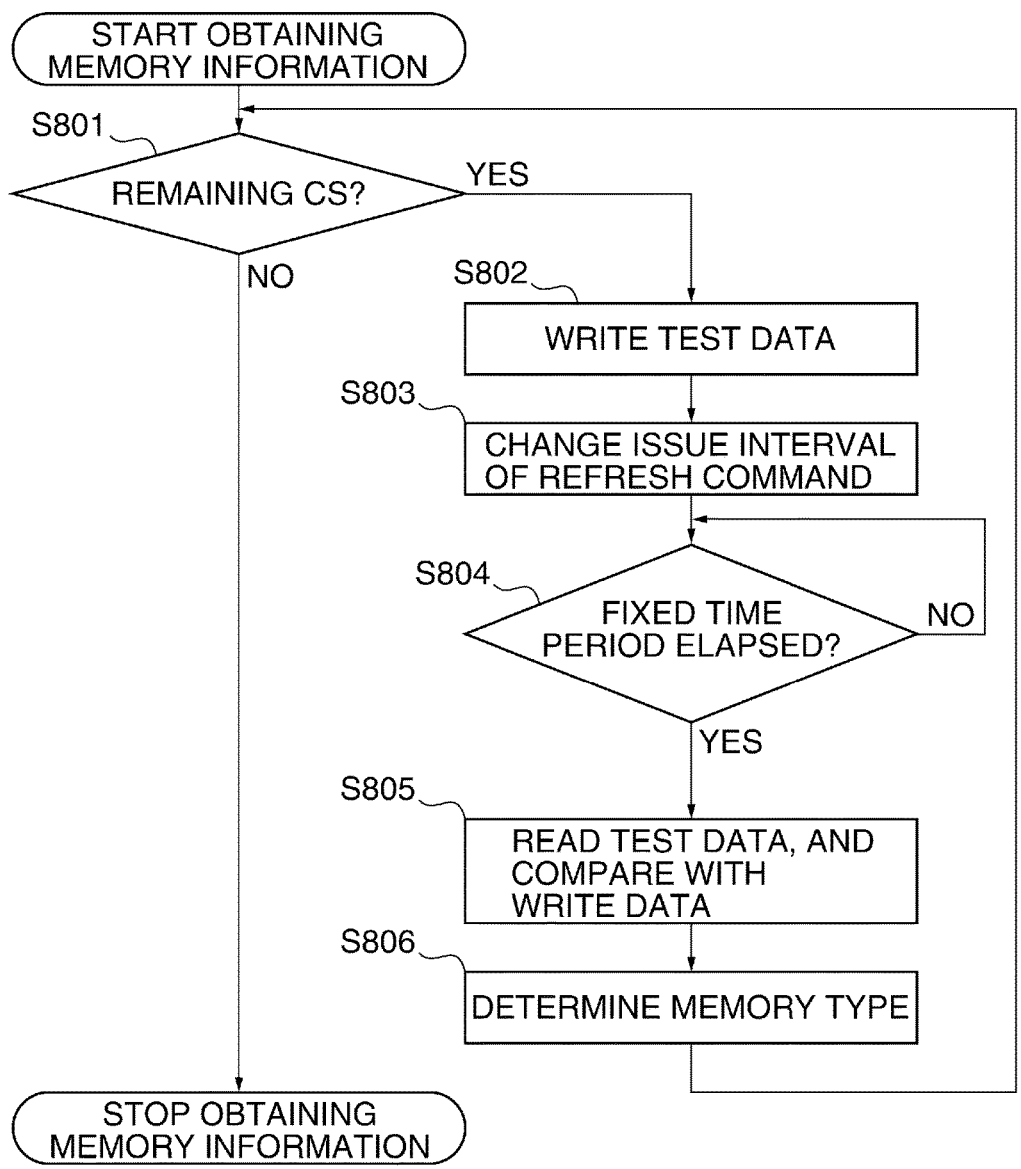
FIG. 8 is a flowchart showing a method for determining whether the memory device (the first RAM and the second RAM) with which the MFP in FIG. 1 is provided is a volatile memory or a nonvolatile memory by using a change of a refresh command interval.

FIG. 8 is a flowchart showing a nonvolatile/volatile memory detection sequence using change of the refresh command interval. Here is also described as an initialization sequence for a memory device (RAM only) that is not limited to the first RAM 120 and the second RAM 121. Then, the processing results about the first RAM 120 and the second RAM 121 will be described.

Although the process in the step S402 in FIG. 4 is executed in advance of step S801, the description about the contents of process in the step S402 is omitted. In the step S801 after the step S402, the CPU 112 determines whether there is a remaining CS of which the memory type has not been determined (step S806). When there is a remaining CS (YES in the step S801), the CPU 112 proceeds with the process to step S802. When there is no remaining CS (NO in the step S801), the CPU 112 finishes the process.

In the step S802, the CPU 112 writes test data to the memory device of the remaining CS that was selected in the step S801. For example, a specific pattern is written in a plurality of addresses. In the subsequent step S803, the CPU 112 executes a process for changing the issue interval of the refresh command to the memory controller 114. For example, a DDR3 SDRAM, which is a volatile memory, needs to re-charge an electric charge lost in discharge periodically. Accordingly, Average Periodic Refresh Interval tREFI ($0 \leq Tcase \leq 85$ (degrees Celsius)) of the JEDEC defines that a refresh command must be issued within an average of 7.8 µs. Since holding data is not guaranteed out of this regulation, the memory controller 114 issues a refresh command once at an average of 7.8 µs. However, a nonvolatile memory holds data without issuing a refresh command. Accordingly, the CPU 112 stops issue of the refresh command, or sets an issue interval as a sufficiently large value like 10 ms.

Next, in step S804, the CPU 112 determines whether a fixed time period that is longer than the issue interval set in the step S803 elapsed. The CPU 112 waits while the fixed time does not elapse (NO in the step S804), and proceeds with the process to step S805 when the fixed time elapsed (YES in the step S804). In the step S805, the CPU 112 reads the value of the address written in the step S802 from the memory device of the selected CS, and compares with write data.

In the next step S806, the CPU 112 determines the memory type of the selected CS, i.e., determines whether the memory device is a nonvolatile memory. As a result of the comparison in the step S805, when the write data agrees with the read data completely, the CPU 112 determines that the memory device of the selected CS is a nonvolatile memory. When the write data does not agree with the read data, the CPU 112 determines that the memory device of the selected CS is a volatile memory. Then, the CPU 112 returns the process to the step S801.

According to such a process, the first RAM 120, which is a DDR3 SDRAM, is determined as a volatile memory, and the second RAM 121, which is a DDR3 MRAM, is determined as a nonvolatile memory.

According to the nonvolatile/volatile memory detection sequence using change of the refresh command interval mentioned above, it becomes possible to determine whether a memory device is nonvolatile. Accordingly, even if a nonvolatile memory and a volatile memory are intermingled and implemented in the memory device implemented in the MFP 100, the F/W is certainly mapped to a nonvolatile memory. Accordingly, the same effect as the first embodiment is obtained.

Next, a third embodiment of the present invention will be described. In the third embodiment, a power control process executed by the CPU 112 for each memory device when shifting to the power saving mode (sleep mode) after the CPU 112 detects the memory devices (the first RAM 120 and second RAM 121) implemented in the MFP 100 is described.

Figure 9:
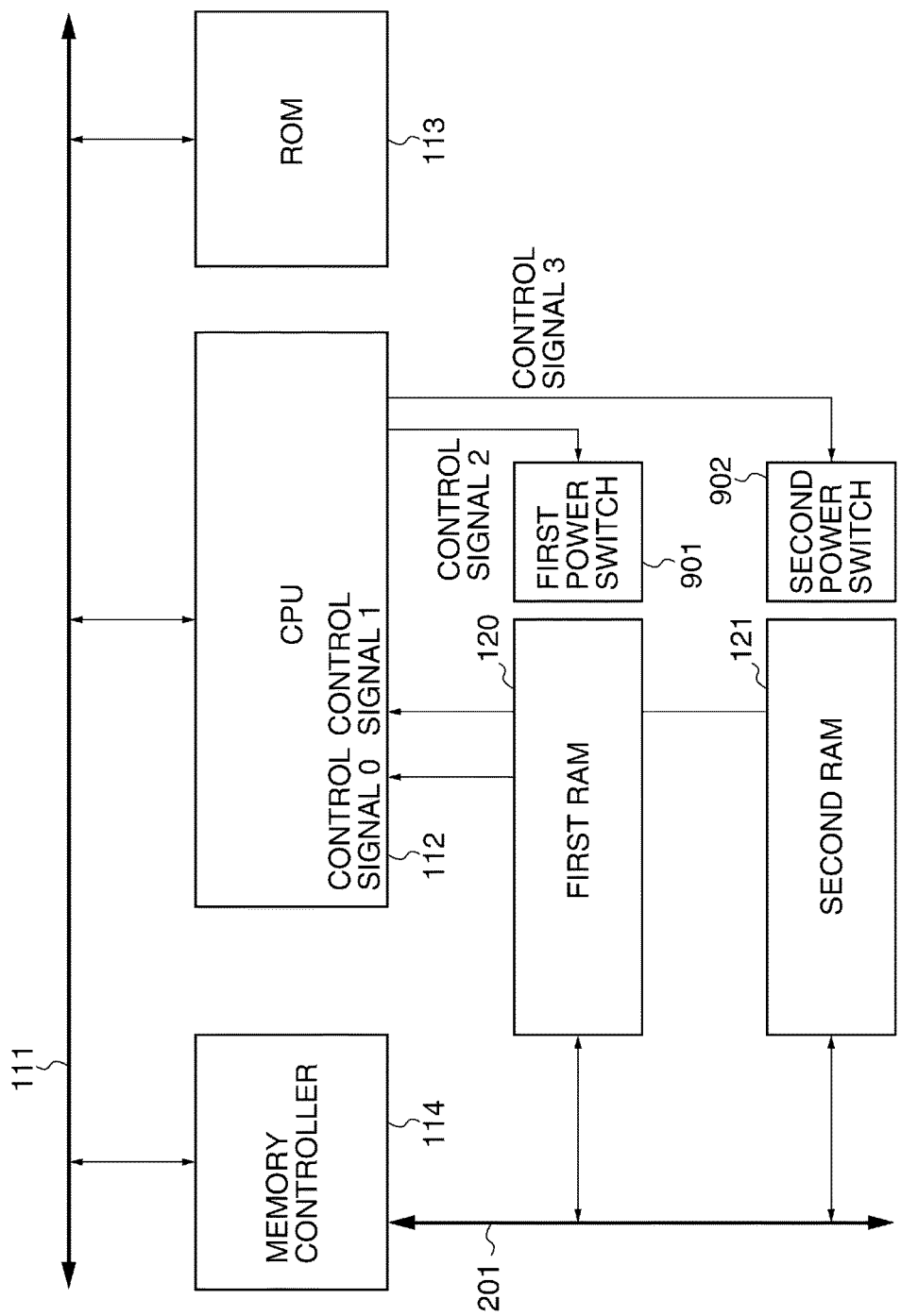
FIG. 9 is a block diagram showing a configuration that controls the power supplies of the first RAM and the second RAM in the controller unit of the MFP in FIG. 1.

FIG. 9 is a block diagram showing a configuration that controls the power supplies of the first RAM 120 and the second RAM 121 in the controller unit 101 of the MFP 100.

The configuration shown in FIG. 9 is configured by adding a first power switch 901 and a second power switch 902 to the configuration shown in FIG. 2. Accordingly, the descriptions of the sections common to FIG. 2 are omitted.

The first power switch 901 and the second power switch 902 change ON/OFF of the power supplies of the first RAM 120 and the second RAM 121, respectively, according to the settings. The CPU 112 controls the power supplies of the first RAM 120 and the second RAM 121 by setting the first power switch 901 and the second power switch 902 with a control signal 2 and a control signal 3 in addition to the process in the first embodiment.

Figure 10:
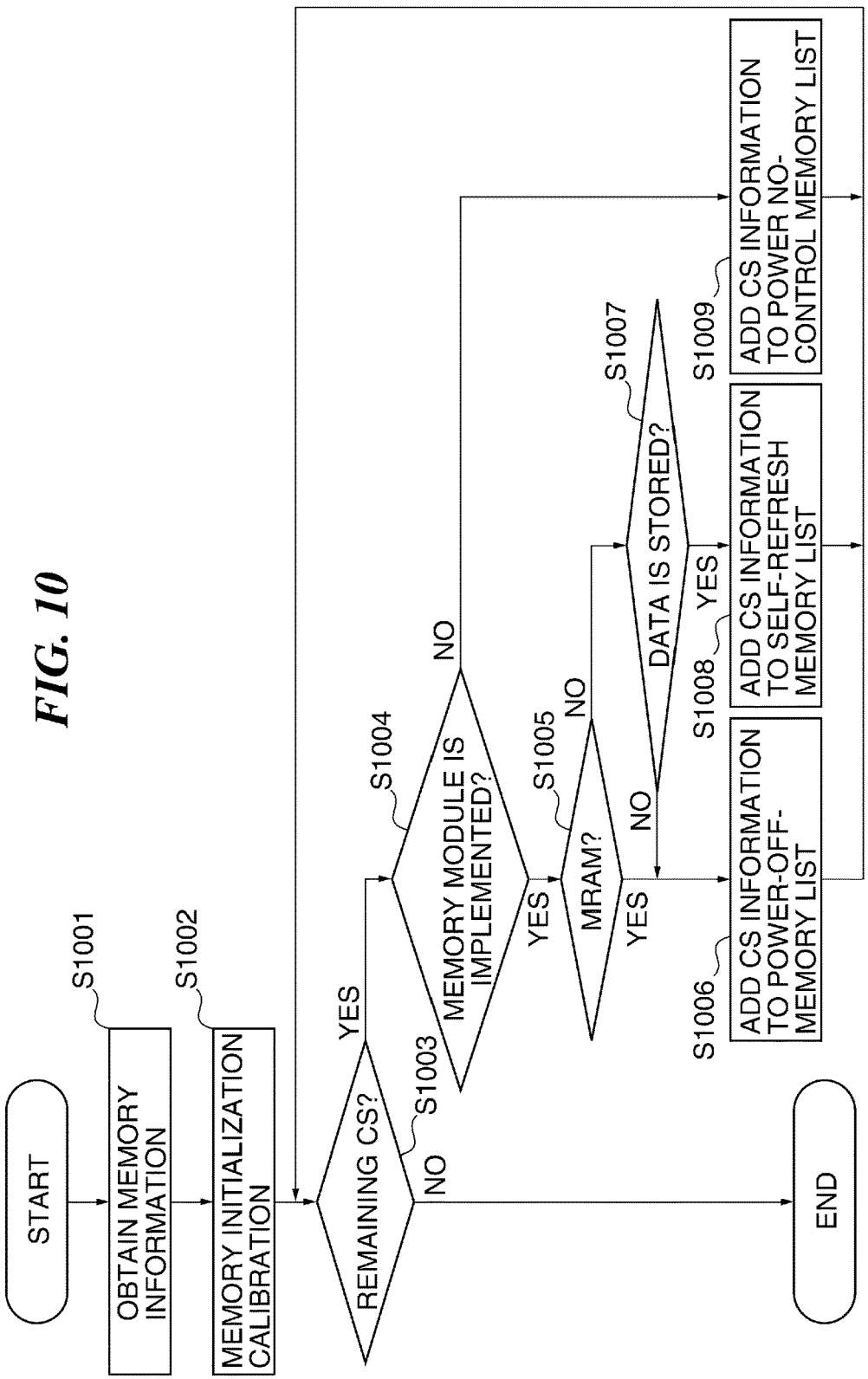
FIG. 10 is a flowchart showing an initialization sequence for a power control memory list for detecting a nonvolatile memory and for controlling the power in the configuration in FIG. 9.

The method by which the CPU 112 detects a nonvolatile memory and controls a power supply in the configuration shown in FIG. 9 will be described with reference to FIG. 10 and FIG. 11. FIG. 10 is a flowchart showing an initialization sequence of a power control memory list. Moreover, FIG. 11 is a view showing an example of the power control memory list generated through the process of the flowchart shown in FIG. 10. Each process in the flowchart in FIG. 10 is achieved when the CPU 112 reads the boot program stored in the ROM 113, develops it to the first RAM 120 or the second RAM 121, and executes the developed program.

Here is also described as the initialization sequence for a memory device (RAM only) that is not limited to the first RAM 120 and the second RAM 121. Then, the processing results about the first RAM 120 and the second RAM 121 will be described. Moreover, the description about control sequences of modules other than a memory device is omitted.

Processes in steps S1001 and S1002 are the same as that in the steps S401 and S402 previously described with reference to FIG. 4. That is, when the power is supplied to the MFP 100, the CPU 112 executes the boot program stored in the ROM 113 through the system bus 111 as described in the first embodiment. Accordingly, the CPU 112 obtains memory information and executes the initialization sequence. At this time, the first power switch 901 and the second power switch 902 shall be always in the state of the power ON.

In the step S1003, the CPU 112 determines whether there is a remaining CS to which the power control setting is not performed. When there is a remaining CS (YES in the step S1003), the CPU 112 proceeds with the process to step S1004. When there is no remaining CS (NO in the step S1003), the CPU 112 finishes the process. In the step S1004, the CPU 112 determines whether the memory module is implemented in the CS selected in the step S1003. When the memory module is implemented (YES in the step S1004), the CPU 112 proceeds with the process to step S1005. When the memory module is not implemented (NO in the step S1004), the CPU 112 proceeds with the process to step S1009.

In the step S1005, the CPU 112 determines whether the memory device of the selected CS is a DDR3 MRAM (a nonvolatile memory) on the basis of the memory information obtained in the step S1001. When the memory device concerned is a DDR3 MRAM (it is a nonvolatile memory (YES in the step S1005)), the CPU 112 proceeds with the process to step S1006. When the memory device concerned is not a DDR3 MRAM (it is a volatile memory (NO in the step S1005)), the CPU 112 proceeds with the process to step S1007. In the step S1007, the CPU 112 determines whether data is stored in the memory device of the selected CS (whether there is data that is held by the memory device). When there is data that is held by the memory device (YES in the step S1007), the CPU 112 proceeds with the process to the step S1008. When there is no data that is held by the memory device (NO in the step S1007), the CPU 112 proceeds with the process to the step S1006.

In the step S1006, the CPU 112 adds (stores) the CS information about the selected CS to a power-off-memory list of the power control memory list. In the step S1008, the CPU 112 adds the CS information about the selected CS to a self-refreshing memory list of the power control memory list. Since the memory device is not implemented in the selected CS, the CPU 112 adds the CS information to a power no-control memory list of the power control memory list in the step S1009. The CPU 112 returns the process to the step S1003 after executing the process in the step S1006, S1008, or S1009.

In this embodiment, the CS0 and the CS1 correspond to the first RAM 120 and the second RAM 121, respectively. There is no memory device in other CSs. The first RAM 120 is a DDR3 SDRAM and the second RAM 121 is a DDR3 MRAM. According to the generation sequence of the power control memory list in FIG. 10, the power control memory list shown in FIG. 11 is obtained. It should be noted that the power control memory list is stored in an HDD (not shown), for example. Although it is determined whether there is data that is held in the step S1007 in the start-up, the same determination may be performed after starting the F/W so as to change the power control memory list.

Figure 12:
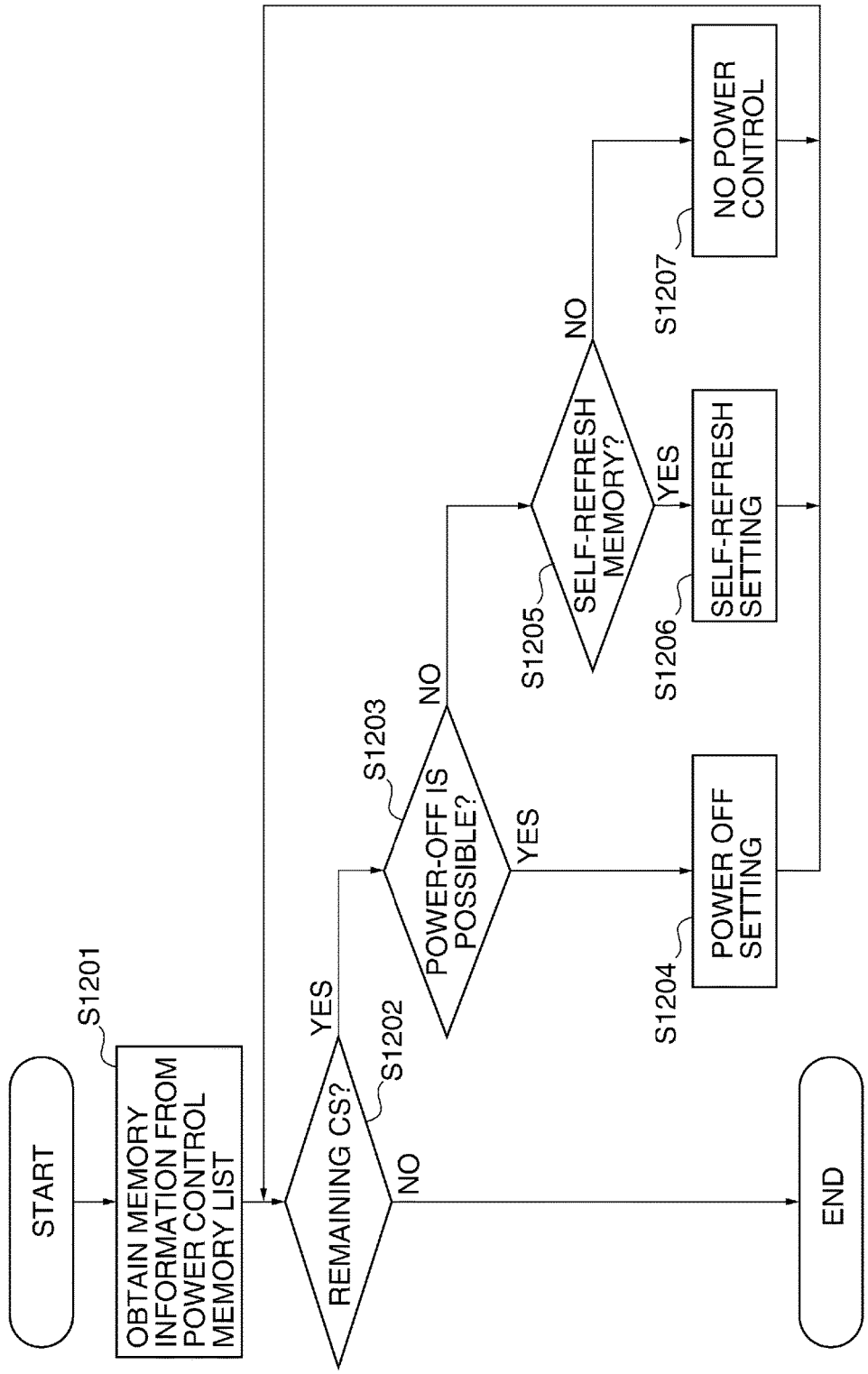
FIG. 12 is a flowchart showing a power control sequence executed when the MFP enters into a power saving mode in the configuration in FIG. 9.

The above-mentioned power control sequence is executed by the CPU 112 with respect to the memory device when the power is supplied to the MFP 100. The power control sequence executed when the MFP 100 enters into the power saving mode will be described with reference to FIG. 12. FIG. 12 is a flowchart showing a power control sequence executed when the MFP 100 enters into the power saving mode.

In step S1201, the CPU 112 obtains the memory information with reference to the power control memory list generated by the initialization sequence according to the flowchart in FIG. 10. In the subsequent step S1202, the CPU 112 determines whether there is a remaining CS to which the power control setting (one of the step S1204, S1206, and S1207) is not performed. When there is a remaining CS (YES in the step S1202), the CPU 112 proceeds with the process to step S1203. When there is no remaining CS (NO in the step S1202), the CPU 112 finishes this process.

In the step S1203, the CPU 112 determines whether the power-off of the memory device of the selected CS is possible on the basis of the memory information obtained in the step S1201. When the power-off is possible because of a nonvolatile memory (YES in the step S1203), the CPU 112 proceeds with the process to the step S1204. When the power-off is not possible because of a volatile memory (NO in the step S1203), the CPU 112 proceeds with the process to the step S1205.

In the step S1205, the CPU 112 determines whether the memory device of the selected CS needs the self-refresh setting. When the self-refresh setting is needed (YES in the step S1205), the CPU 112 proceeds with the process to step S1206. When the self-refresh setting is not needed (NO in the step S1205), the CPU 112 proceeds with the process to step S1207.

In the step S1204, the CPU 112 sets the power switch (the first power switch 901 or the second power switch 902) in order to turn OFF the power of the memory device of the selected CS. Accordingly, when the MFP 100 enters into the power saving mode, the power of the memory device of the selected CS is turned OFF.

In the step S1206, the CPU 112 performs setting to the memory controller 114 for making the memory device of the selected CS shift to the self-refresh mode. Accordingly, when the MFP 100 enters into the power saving mode, the memory device of the selected CS shifts to the self-refresh mode. It should be noted that the power may be turned OFF without self-refreshing after saving the data held in the memory device to an HDD (not shown) etc.

In the step S1207, the CPU 112 does not control the power because any memory device is not implemented in the selected CS and there is no power consumption. The CPU 112 returns the process to the step S1202 after executing the process in the step S1204, S1206, or S1207.

It should be noted that the CPU 112 sets a power switch of a memory device in the power-OFF state in the power saving mode so that the power turns ON when the MFP 100 returns to the regular operation mode from the power saving mode. Accordingly, in the case of the power control memory list in FIG. 11, the power of the power switch 902 of the second RAM 121 that is a nonvolatile memory (DDR3 MRAM) is turned ON. Moreover, when the MFP 100 returns to the regular operation mode from the power saving mode, the CPU 112 makes a self-refresh memory device (not applicable in the power control memory list in FIG. 11) return to the normal operation through the memory controller 114.

As described above, in the third embodiment, the power consumption of the MFP 100 in the power saving mode is reduced by controlling the power as mentioned above.

Next, a fourth embodiment of the present invention will be described. In the third embodiment, the CPU 112 obtains memory information from an SPD implemented in a memory module in the step S1001 of the initialization sequence, and determines whether the memory module is a nonvolatile memory or a volatile memory as with the first embodiment. On the other hand, in the fourth embodiment, it is determined whether a memory device is a nonvolatile memory or a volatile memory by checking whether data is held when the power of an implemented memory device is once shut down and is supplied after a fixed time period elapses.

Figure 13:
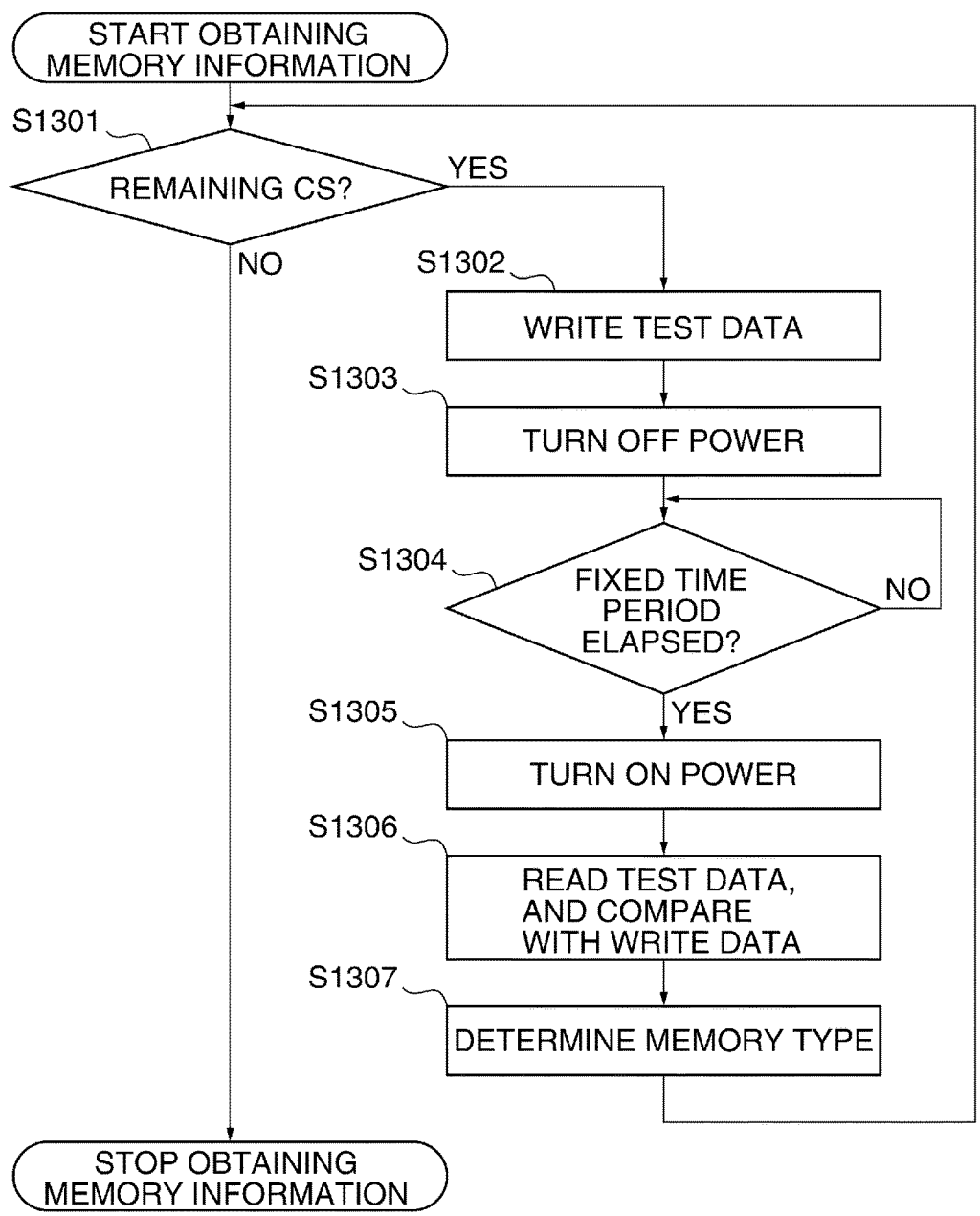
FIG. 13 is a flowchart showing a method for determining whether the memory device (the first RAM and the second RAM) with which the MFP in FIG. 1 is provided is a volatile memory or a nonvolatile memory by using shut-off of the power.

FIG. 13 is a flowchart showing a nonvolatile/volatile memory detection sequence using shutdown of the power. The nonvolatile/volatile memory detection sequence in FIG. 13 is executed by the boot program after executing the step S1002 (see FIG. 10) of the initialization sequence. Here is also described as the initialization sequence for a memory device (RAM only) that is not limited to the first RAM 120 and the second RAM 121. Then, the processing results about the first RAM 120 and the second RAM 121 will be described.

In step S1301, the CPU 112 first determines whether there is a remaining CS of which the memory type has not been determined (step S1307). When there is a remaining CS (YES in the step S1301), the CPU 112 proceeds with the process to step S1302. When there is no remaining CS (NO in the step S1301), the CPU 112 finishes this process. In the step S1302, the CPU 112 writes test data to the memory device of the remaining CS that was selected in the step S1301. For example, a specific pattern is written in a plurality of addresses of the remaining CS.

In the subsequent step S1303, the CPU 112 performs a setting of power OFF to the power switch of the memory device of the selected CS, and sets a time period for the power OFF. As a result, the power supply to the memory device of the selected CS is stopped. Then, in step S1304, the CPU 112 determines whether a fixed time period, which is longer than the time period set in the step S1303, elapsed. The CPU 112 waits while the fixed time period does not elapse (NO in the step S1304). When the fixed time period elapsed (YES in the step S1304), the CPU 112 proceeds with the process to step S1305. In the step S1305, the CPU 112 performs a setting of power ON to the power switch of the memory device of the selected CS. As a result, the power supply to the memory device of the selected CS is resumed.

In the next step S1306, the CPU 112 reads the value of the address written in the step S1302 from the memory device of the selected CS, and compares with write data. Then, in step S1307, the CPU 112 determines the memory type of the memory device of the selected CS. Specifically, as a result of the comparison in the step S1306, when the write data agrees with the read data completely, the CPU 112 determines that the memory device of the selected CS is a nonvolatile memory. On the other hand, when the write data does not agree with the read data, the CPU 112 determines that the memory device of the selected CS is a volatile memory. The process returns to the step S1301 after executing the process in the step S1307.

According to such a process, the first RAM 120, which is a DDR3 SDRAM, is determined as a volatile memory, and the second RAM 121, which is a DDR3 MRAM, is determined as a nonvolatile memory.

According to the nonvolatile/volatile memory detection sequence using shutdown of the power, it becomes possible to determine whether a memory device is nonvolatile. Accordingly, even if a nonvolatile memory and a volatile memory are intermingled and implemented in the memory device implemented in the MFP 100, the power consumption in the power saving mode is reduced.

Next, a fifth embodiment of the present invention will be described. In the first and second embodiments, mapping to a memory device at the time of start-up of the MFP 100 was described. Moreover, in the third and fourth embodiment, a power control process at the time of start-up of the MFP 100 and at the time of transition to the power saving mode was described. On the other hand, in the fifth embodiment, a power control sequence executed when various functions (a copy function, a print function, and a transmission function) with which the MFP 100 is provided are performed will be described with reference to FIG. 14.

Figure 14:
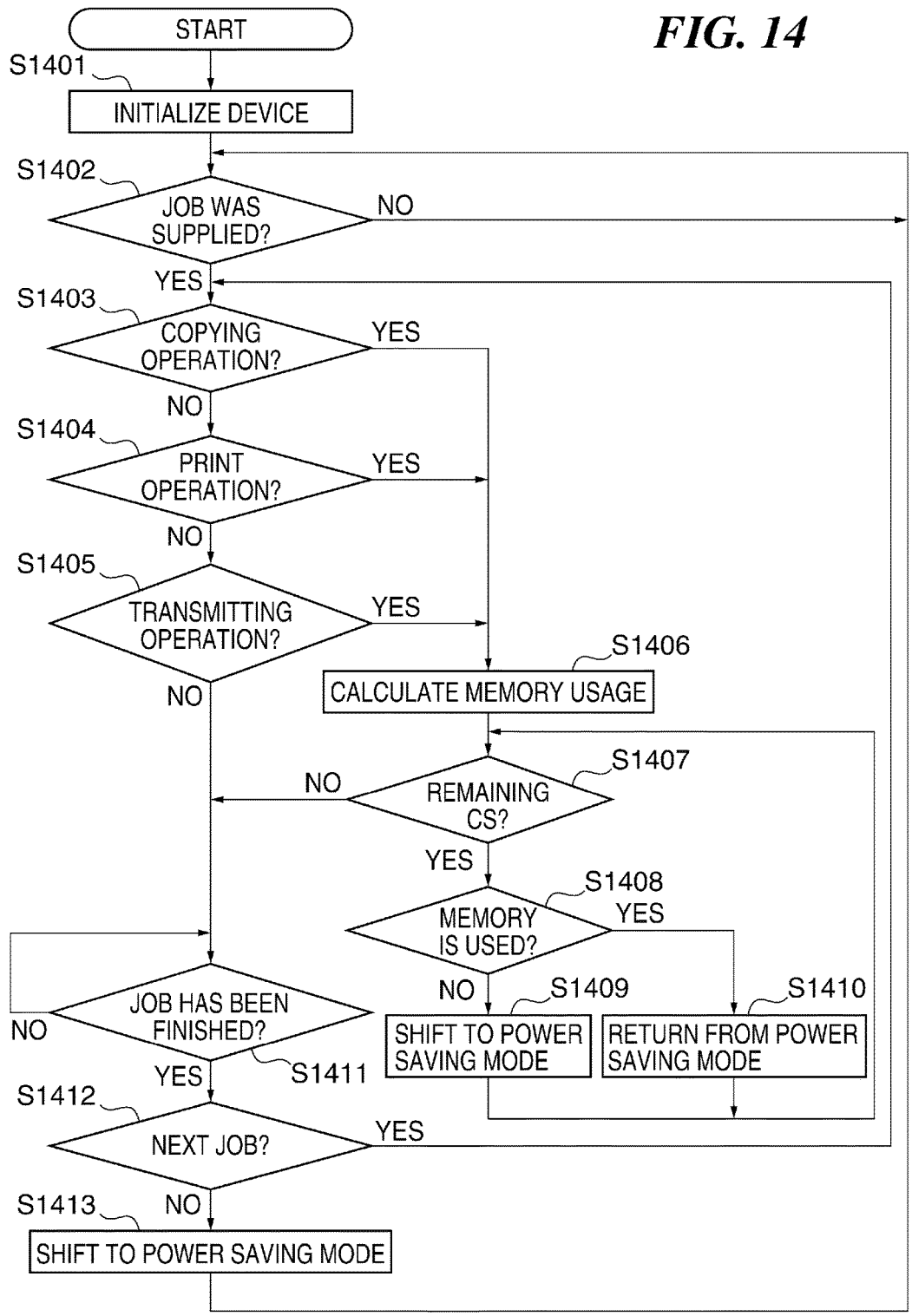
FIG. 14 is a flowchart showing the power control sequence executed during an operation of the MFP equipped with the configuration shown in FIG. 1 and FIG. 9.

FIG. 14 is a flowchart showing the power control sequence executed during an operation of the MFP 100. Each process in the flowchart in FIG. 14 is achieved when the CPU 112 reads the boot program stored in the ROM 113, develops it to the first RAM 120 or the second RAM 121, and executes the developed program.

The operations including a copying operation, a print operation, a transmitting operation, etc., which are performable by the MFP 100, need different memory capacities, respectively, as work memories to store intermediate image data etc. Accordingly, in this embodiment, a power switching operation to a memory device is performed according to a memory capacity needed for each operation. The flowchart in FIG. 14 shows a calibration method therefor.

When the power is supplied to the MFP 100, the CPU 112 executes first the initialization sequence described in the first and third embodiment in step S1401. Accordingly, the F/W is stored in a predetermined memory device, and the power control memory list is created (updated), and the MFP 100 becomes a standby state. In this embodiment, since the first RAM 120 is a volatile memory, the first RAM 120 shall store the intermediate image data etc. that are temporarily used. Moreover, since the second RAM 121 is a nonvolatile memory, the second RAM 121 shall store the F/W.

In the subsequent step S1402, the CPU 112 determines whether a job was supplied or not. The CPU 112 waits while a job is not supplied (NO in the step S1402). When a job was supplied (YES in the step S1402), the CPU 112 proceeds with the process to step S1403. In the step S1403, the CPU 112 determines whether the job is a copying operation. When the job is a copying operation (YES in the step S1403), the CPU 112 proceeds with the process to step S1406. When the job is not a copying operation (NO in the step S1403), the CPU 112 proceeds with the process to step S1404. It should be noted that the copying operation captures an image of an original set on a feeder of the MFP 100 with a scanner unit, applies image processings, such as a color conversion, a density conversion, an edge enhancement processing, and a screen treatment, forms an image on a paper sheet with the printer unit 102, and outputs the printed sheet.

In the step S1404, the CPU 112 determines whether the job is a print operation. When the job is a print operation (YES in the step S1404), the CPU 112 proceeds with the process to step S1406. When the job is not a print operation (NO in the step S1404), the CPU 112 proceeds with the process to step S1405. It should be noted that the print operation applies image processings, such as a rendering processing, a color conversion, a density conversion, an edge enhancement processing, and a screen treatment, to image data of PDL, JPEG, or the like that is received from the host computer 150 or a USB-connection external apparatus (not shown), forms an image on a paper sheet with the printer unit 102, and outputs the printed sheet.

In the step S1405, the CPU 112 determines whether the job is a transmitting operation. When the job is a transmitting operation (YES in the step S1405), the CPU 112 proceeds with the process to step S1406. When the job is not a transmitting operation (NO in the step S1405), the CPU 112 proceeds with the process to step S1411. It should be noted that the transmitting operation first captures an image of an original set on the feeder of the MFP 100 with the scanner unit, applies image processings, such as a color conversion, a density conversion, an edge enhancement processing, and a screen treatment, to the captured image, and generates a file of the JPEG format etc. Then, the generated file is transmitted to a designated e-mail address via the network, or to an external facsimile apparatus through the telephone line connected to a modem. It should be noted that the order of the processes (determinations) in the steps S1403 through S1405 is random, any determination may be first performed.

In the step S1406, the CPU 112 calculates a required work memory area (memory usage) to one operation selected in the steps S1403 through S1405. In the case of the copying operation and the transmitting operation, the CPU 112 calculates the work memory area on the basis of a sheet size etc., in order to store the scan data as the intermediate image data temporarily. In the case of the print operation, the CPU 112 calculates a work memory area for storing intermediate language data, raster image data, etc. temporarily and a work memory area required for printing, on the basis of a sheet size etc. As the result, the CPU 112 selects memory devices that should be used according to the result of the memory mapping executed in the initialization sequence in the step S1401.

The CPU 112 performs the process for updating the setting of the power control to a memory device of every CS according to the third embodiment, and determines whether there is a remaining CS that has not been processed in the step S1407. When there is a remaining CS (YES in the step S1407), the CPU 112 proceeds with the process to step S1408. When there is no remaining CS (NO in the step S1407), the CPU 112 proceeds with the process to the step S1411.

In the step S1408, the CPU 112 determines whether the memory device of the CS selected in the step S1407 is selected as the memory device used in the step S1406. When the memory device is not selected as the memory device used (NO in the step S1408), the CPU 112 proceeds with the process to step S1410. When the memory device is selected as the memory device used (YES in the step S1408), the CPU 112 proceeds with the process to step S1409.

In the step S1409, the CPU 112 determines that the memory device of the selected CS is not used, and performs the process shifting to the power saving mode that is executed in the steps S1203 through S1207 in FIG. 12 (the third embodiment). It should be noted that signal timings are adjusted so as to maintain the operation of a memory device of a CS other than the selected CS, even when the power of the memory device of the selected CS is turned OFF. When the memory device of the selected CS is in the power saving mode and the power is OFF, the CPU 112 makes the memory device concerned return to the regular operation mode from the power saving mode in the step S1410. It should be noted that no process will be performed in the step S1410, when the memory device of the selected CS is in the regular operation mode. The CPU 112 returns the process to the step S1407 after executing the process in the step S1409 or S1410.

In the step S1411, the CPU 112 determines whether the performed job has been finished. The CPU 112 waits while the job is not finished (NO in the step S1411), and proceeds with the process to step S1412 when the job has been finished (YES in the step S1411). In the step S1412, the CPU 112 determines whether there is a next job. When there is a next job (YES in the step S1412), the CPU 112 returns the process to step S1403. When there is not a next job (NO in the step S1412), the CPU 112 proceeds with the process to step S1413.

In the step S1413, the CPU 112 performs the process shifting to the power saving mode that is executed in the steps S1203 through S1207 in FIG. 12 (the third embodiment) to all the memory devices. Then, the CPU 112 returns the process to the step S1402.

According to the above-mentioned power control sequence, the power consumption of the MFP 100 is reduced, because an unnecessary memory device is shifted to the power saving mode even if a job is supplied.

Although the embodiments of the invention have been described, the present invention is not limited to the above-mentioned embodiments, the present invention includes various modifications as long as the concept of the invention is not deviated. Furthermore, the embodiments mentioned above show examples of the present invention, and it is possible to combine the embodiments suitably.

In the first embodiment, the modules that constitute the MFP 100 are supported as the hardware devices (see FIG. 1). On the other hand, functions of some modules like the image processing unit 119 may be achieved when the CPU 112 executes programs stored in the ROM 113. In such a case, the programs that achieve the functions of the interpreter 117, the renderer 118, and the image processing unit 119 shall support the read/write function of the various data to a volatile memory.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-198330, filed Sep. 25, 2013, which is hereby incorporated by reference herein in its entirety.

What is claimed is:

1. An information processing apparatus having plural writable semiconductor memories including at least a volatile memory and a nonvolatile memory, the information processing apparatus comprising:
a mapping unit configured to map the plural writable semiconductor memories;
a writing unit configured to store firmware in a memory among the plural writable semiconductor memories;
a detection unit configured to detect whether each of the plural writable semiconductor memories is a nonvolatile memory or a volatile memory; and
a setting unit configured to perform a setting to the detected nonvolatile memory and to perform another setting different from the setting for the detected nonvolatile memory to the detected volatile memory, the setting and the another setting being performed as part of an initialization sequence performed in response to a supply of power to the information processing apparatus,
wherein in a case where the information processing apparatus is to shift to a power saving state from an operation state different than the power saving state:
the another setting set to the detected volatile memory as part of the initialization sequence performed in response to the supply of power to the information processing apparatus causes the detected volatile memory to, in a case where the detected volatile memory stores data, be shifted to the power saving state, and causes the detected volatile memory to, in a case where the detected volatile memory does not store data, be powered off, and
the setting set to the detected nonvolatile memory as part of the initialization sequence performed in response to the supply of power to the information processing apparatus causes the detected nonvolatile memory to be powered off regardless of whether the detected volatile memory stores data, and wherein as another part of the initialization sequence performed in response to the supply of power to the information processing apparatus:
the mapping unit is configured to map the plural writable semiconductor memories such that first information corresponding to the detected nonvolatile memory is made part of a firmware storing list based on a storing flag of the detected nonvolatile memory, and second information corresponding to the detected volatile memory is made part of a list different from the firmware storing list of which the first information corresponding to the detected nonvolatile memory is made part of, and
the writing unit is configured to store the firmware in the detected nonvolatile memory based on the first information made part of the firmware storing list and not store the firmware in the detected volatile memory based on the second information,
wherein the mapping unit, the writing unit, the detection unit, and the setting unit are implemented by at least one processor.

2. The information processing apparatus according to claim 1, wherein said setting unit comprises an address mapping unit configured to map the predetermined address at which the predetermined data is written to the detected nonvolatile memory.

3. The information processing apparatus according to claim 1, wherein said setting unit comprises a power control unit configured to turn OFF power of the detected nonvolatile memory when the detected nonvolatile memory shifts to the power saving state from a regular operation state, and to turn ON the power of the detected nonvolatile memory when the detected nonvolatile memory returns to the regular operation state from the power saving state.

4. The information processing apparatus according to claim 1, wherein the detection unit determines that a semiconductor memory among the plural writable semiconductor memories is the nonvolatile memory when predetermined data written at a predetermined address of the semiconductor memory does not vary even when a refresh command is not issued within a fixed time period after writing the predetermined data at the predetermined address of the semiconductor memory.

5. The information processing apparatus according to claim 4, wherein the detection unit writes predetermined data at predetermined addresses of each of the plural writable semiconductor memories and reads data from the predetermined addresses of each of the plural writable semiconductor memories after the fixed time period to detect whether each of the plural writable semiconductor memories is the nonvolatile memory or the volatile memory, and
in a case where the predetermined data can be read out from the predetermined address of one of the plural writable semiconductor memories after the fixed time period, the detection unit detects that the one of the plural writable semiconductor memories is the nonvolatile memory, and in a case where at least a part of the predetermined data cannot be read out from the predetermined address of another one of the plural writable semiconductor memories after the fixed time period, the detection unit detects that the another one of the plural writable semiconductor memories is the volatile memory.

6. A method executed by a computer, the method comprising:
   detecting whether each of plural writable semiconductor memories of an information processing apparatus is a nonvolatile memory or a volatile memory;
   performing a setting to the detected nonvolatile memory and performing another setting different from the setting for the detected nonvolatile memory to the detected volatile memory, the setting and the another setting being performed as part of an initialization sequence performed in response to a supply of power to the information processing apparatus, wherein in a case where the information processing apparatus is to shift to a power saving state from an operation state different than the power saving state:
   the another setting set to the detected volatile memory as part of the initialization sequence performed in response to the supply of power to the information processing apparatus causes the detected volatile memory to, in a case where the detected volatile memory stores data, be shifted to the power saving state, and causes the detected volatile memory to, in a case where the detected volatile memory does not store data, be powered off, and
   the setting set to the detected nonvolatile memory as part of the initialization sequence performed in response to the supply of power to the information processing apparatus causes the detected nonvolatile memory to be powered off regardless of whether the detected volatile memory stores data; and
   as another part of the initialization sequence performed in response to the supply of power to the information processing apparatus:
   mapping the plural writable semiconductor memories such that first information corresponding to the detected nonvolatile memory is made part of a firmware storing list based on a storing flag of the detected nonvolatile memory, and second information corresponding to the detected volatile memory is made part of a list different from the firmware storing list of which the first information corresponding to the detected nonvolatile memory is made part of, and
   storing the firmware in the detected nonvolatile memory based on the first information made part of the firmware storing list and not storing the firmware in the detected volatile memory based on the second information.

7. An information device comprising:
   plural writable semiconductor memories including at least a volatile memory and a nonvolatile memory; and
   a memory control device configured to control operations of said plural writable semiconductor memories,
   wherein said memory control device comprises:
   a mapping unit configured to map the plural writable semiconductor memories;
   a writing unit configured to store firmware in a memory among the plural writable semiconductor memories;
   a detection unit configured to detect whether each of the plural writable semiconductor memories is a nonvolatile memory or a volatile memory; and
   a setting unit configured to perform a setting to the detected nonvolatile memory and to perform another setting different from the setting for the detected nonvolatile memory to the detected volatile memory, the setting and the another setting being performed as part of an initialization sequence performed in response to a supply of power to the information device, wherein in a case where the information device is to shift to a power saving state from an operation state different than the power saving state:
   the another setting set to the detected volatile memory as part of the initialization sequence performed in response to the supply of power to the information device causes the detected volatile memory to, in a case where the detected volatile memory stores data, be shifted to the power saving state, and causes the detected volatile memory to, in a case where the detected volatile memory does not store data, be powered off, and
   the setting set to the detected nonvolatile memory as part of the initialization sequence performed in response to the supply of power to the information device causes the detected nonvolatile memory to be powered off regardless of whether the detected volatile memory stores data, and
   wherein as another part of the initialization sequence performed in response to the supply of power to the information device:
   the mapping unit is configured to map the plural writable semiconductor memories such that first information corresponding to the detected nonvolatile memory is made part of a firmware storing list based on a storing flag of the detected nonvolatile memory, and second information corresponding to the detected volatile memory is made part of a list different from the firmware storing list of which the first information corresponding to the detected nonvolatile memory is made part of, and
   the writing unit is configured to store the firmware in the detected nonvolatile memory based on the first information made part of the firmware storing list and not store the firmware in the detected volatile memory based on the second information,
   wherein the mapping unit, the writing unit, the detection unit, and the setting unit are implemented by at least one processor.

8. A non-transitory computer-readable storage medium storing a control program causing a computer to execute a method for an information device equipped with plural writable semiconductor memories, the method comprising:
   detecting whether each of plural writable semiconductor memories is a nonvolatile memory or a volatile memory;
   performing a setting to the detected nonvolatile memory and performing another setting different from the setting for the detected nonvolatile memory to the detected volatile memory, the setting and the another setting being performed as part of an initialization sequence performed in response to a supply of power to the information device, wherein in a case where the information device is to shift to a power saving state from an operation state different than the power saving state:
   the another setting set to the detected volatile memory as part of the initialization sequence performed in response to the supply of power to the information device causes the detected volatile memory to, in a case where the detected volatile memory stores data, be shifted to the power saving state, and causes the detected volatile memory to, in a case where the detected volatile memory does not store data, be powered off, and
   the setting set to the detected nonvolatile memory as part of the initialization sequence performed in response to the supply of power to the information device causes the detected nonvolatile memory to be powered off regardless of whether the detected volatile memory stores data; and as another part of the initialization sequence performed in response to the supply of power to the information processing apparatus:

mapping the plural writable semiconductor memories such that first information corresponding to the detected nonvolatile memory is made part of a firmware storing list based on a storing flag of the detected nonvolatile memory, and second information corresponding to the detected volatile memory is made part of a list different from the firmware storing list of which the first information corresponding to the detected nonvolatile memory is made part of, and storing the firmware in the detected nonvolatile memory based on the first information made part of the firmware storing list and not storing the firmware in the detected volatile memory based on the second information.

9. An information processing apparatus having plural writable semiconductor memories including at least a volatile memory and a nonvolatile memory, the information processing apparatus comprising:

a mapping unit configured to map the plural writable semiconductor memories;

a writing unit configured to store firmware in a memory among the plural writable semiconductor memories;

a detection unit configured to detect whether each of the plural writable semiconductor memories is a nonvolatile memory or a volatile memory; and a setting unit configured to perform a first setting ensuring that predetermined information is kept in the detected nonvolatile memory and to perform a second setting different from the first setting indicating whether other predetermined information including temporarily used image forming information is kept in the detected volatile memory, the first setting and the second setting being performed as part of an initialization sequence performed in response to a supply of power to the information processing apparatus, wherein in a case where the information processing apparatus is to shift to a power saving state from an operation state different than the power saving state:

the second setting set to the detected volatile memory as part of the initialization sequence performed in response to the supply of power to the information processing apparatus causes the detected volatile memory to, in a case where the detected volatile memory stores the temporarily used image forming information, be shifted to the power saving state, and causes the detected volatile memory to, in a case where the detected volatile memory does not store the temporarily used image forming information, be powered off, and the setting set to the detected nonvolatile memory as part of the initialization sequence performed in response to the supply of power to the information processing apparatus causes the detected nonvolatile memory to be powered off regardless of whether the detected volatile memory stores the temporarily used image forming information, and wherein as another part of the initialization sequence performed in response to the supply of power to the information processing apparatus:

the mapping unit is configured to map the plural writable semiconductor memories such that first information corresponding to the detected nonvolatile memory is made part of a firmware storing list based on a storing flag of the detected nonvolatile memory, and second information corresponding to the detected volatile memory is made part of a list different from the firmware storing list of which the first information corresponding to the detected nonvolatile memory is made part of, and the writing unit is configured to store the firmware in the detected nonvolatile memory based on the first information made part of the firmware storing list and not store the firmware in the detected volatile memory based on the second information, wherein the mapping unit, the writing unit, the detection unit, and the setting unit are implemented by at least one processor.

* * * * *